United States Patent
Okamoto

(10) Patent No.: US 8,654,153 B2
(45) Date of Patent: Feb. 18, 2014

(54) PROJECTION DEVICE, PROJECTION DEVICE CONTROL METHOD, AND PROJECTION DEVICE CONTROL PROGRAM

(75) Inventor: Shuji Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 13/127,810

(22) PCT Filed: Apr. 16, 2009

(86) PCT No.: PCT/JP2009/057703
§ 371 (c)(1), (2), (4) Date: May 5, 2011

(87) PCT Pub. No.: WO2010/052943
PCT Pub. Date: May 14, 2010

(65) Prior Publication Data
US 2011/0221781 A1    Sep. 15, 2011

(30) Foreign Application Priority Data

Nov. 7, 2008   (JP) ................................ P2008-286715

(51) Int. Cl.
*G09G 5/00* (2006.01)
(52) U.S. Cl.
USPC .......................................... 345/660; 345/629

(58) Field of Classification Search
None
See application file for complete search history.

(56) References Cited

U.S. PATENT DOCUMENTS 7,423,658 B1    9/2008 Uomori et al.

FOREIGN PATENT DOCUMENTS

| JP | 05323447 | * | 5/1992 |
|----|----------|---|--------|
| JP | 7-93522 A | | 4/1995 |
| JP | 10-122863 A | | 5/1998 |
| JP | 2001-209827 A | | 8/2001 |
| JP | 2005-142938 A | | 6/2005 |
| JP | 2006-81854 A | | 3/2006 |
| JP | 2006-345087 A | | 12/2006 |
| JP | 2007-43528 A | | 2/2007 |
| JP | 2007-205915 A | | 8/2007 |

OTHER PUBLICATIONS

International Search Report dated Jun. 23, 2009 for PCT/JP2009/057703.

* cited by examiner

*Primary Examiner* — Ryan R Yang
(74) *Attorney, Agent, or Firm* — Birch, Stewart, Kolasch & Birch, LLP

(57) ABSTRACT

A projection device for projecting an image includes: a distance detector that detects the distance between the projection device and a measurement object onto which the image is to be projected; and an image projector that projects a scale image in actual size onto the measurement object based on the distance detected by the distance detector.

6 Claims, 15 Drawing Sheets

PROJECTION DEVICE, PROJECTION DEVICE CONTROL METHOD, AND PROJECTION DEVICE CONTROL PROGRAM

TECHNICAL FIELD

The present invention relates to a projection device, a projection device control method, and a projection device control program.

Priority is claimed on Japanese Patent Application No. 2008-286715, filed Nov. 7, 2008, the content of which is incorporated herein by reference.

BACKGROUND ART

Recently, electronic measurement technologies with a ruler or protractor have been developed with the advance of measurement technologies with an information technology.

Patent Document 1 discloses an image processing device including: a display unit that displays an image; and an image combining unit that generates a scale image (scale image) indicating a substantially actual size with respect to a specified position on an image displayed on the display unit, based on three-dimensional position information of a subject (object to be measured) imaged on the image. The image combining unit combines the scale image with the image. The display unit displays the image combined with the scale image.

This technology is a technology of the image processing device combining a scale image with an image to be displayed and displaying the combined image, and measuring the length of a subject by having a user of the image processing device refer to the displayed image.

On the other hand, projection devices that project an image have been prevailed. With the prevalence, miniaturization of projection devices, development of higher quality images to be projected, and the like have been in progress. It has been considered that a small projection device that projects high-quality images is mounted on a cell phone device and the like.

Patent Document 2 discloses a light spot display device that irradiates a light and displays a light spot on an object to be displayed. The light spot display device includes: an irradiation source that is distanced away from the object to be displayed, and irradiates a light; an optical element that is positioned on an optical path between the irradiation source and the object to be displayed, and spreads the light irradiated from the irradiation source; a light shield that is positioned on an optical path between the optical element and the object to be displayed, and has multiple through holes corresponding to the light spots to be displayed on the object to be displayed; and a varying unit that varies a length of the optical path between the optical element and the light shield.

This technology is a technology of varying the interval size between the optical element and the light shield having the through holes even if the interval size between the light source and the object to be displayed varies, and thereby varying the direction of the light irradiated from the through holes to equalize the interval size between two adjacent light spots displayed on the object to be displayed.

CITATION LIST

Patent Document

[Patent Document 1] Japanese Unexamined Patent Application, First Publication No. 2001-209827
[Patent Document 2] Japanese Unexamined Patent Application, First Publication No. H10-122863

DISCLOSURE OF THE INVENTION

Problems to be Solved by the Invention

However, the technology disclosed in Patent Document 1 has a demerit in that the length of a subject (object to be measured) cannot be measured unless the image processing device includes an imager and a display unit, and a user refers to an image displayed on the image processing device. Additionally, there is a demerit in that the higher mobility the image processing device has, the smaller the display unit that displays an image becomes, and the sizes of a subject image displayed and the scale image (scale image) displayed are smaller than the actual sizes, thereby making it impossible to quickly and reliably measure the precise size.

Further, the technology disclosed in the Patent Document 2 has a demerit in that the light spots, which are distanced at the same interval, can be projected, but the length of an object and the like cannot be measured.

Thus, the technologies of the related art have a demerit in that a measurer cannot quickly and reliably measure the size of an object to be measured.

The present invention is made in view of the above situations. An object of the present invention is to provide a projection device, a projection device control method, and a projection device control program for a user to quickly and reliably measure the size of an object to be measured.

Means for Solving the Problems (1) The present invention has been made to solve the above problems. One embodiment of the present invention is a projection device that projects an image. The projection device includes, but is not limited to: a distance detector that detects a distance between the projection device and a measurement object onto which the image is to be projected; and an image projector that projects a scale image in actual size onto the measurement object based on the distance detected by the distance detector.

According to the above configuration, the projection device detects the distance between the projection device and the measurement object, and projects a scale image in actual size onto the measurement object. Thereby, a measurer can quickly and reliably measure the size of the measurement object.

(2) According to the projection device of the one embodiment of the present invention, the projection device further includes, but is not limited to, a scale interval determining unit that determines, based on the distance detected by the distance detector, a scale interval of the scale image to be projected by the image projector.

According to the above configuration, the projection device determines an interval of the scale to be projected, based on the detected distance between the projection device and the measurement object. Accordingly, for example, when the size of a small measurement object is measured, a measurer of the projection device makes the distance between the projection device and the measurement object small, and thereby can project a scale with a small unit (such as 1 millimeter). Accordingly, the measurer can quickly measure the measurement object.

(3) According to the projection device of the one embodiment of the present invention, the projection device further includes, but is not limited to, a brightness determining unit that determines, based on the distance detected by the distance detector, a brightness of the scale image to be projected by the image projector.

According to the above configuration, the projection device determines the brightness of a scale to be projected, based on the distance between the detected distance between the projection device and the measurement object. Accordingly, even when the measurement object, which is far distanced from the projection device, is measured, a clear scale image can be projected onto the measurement object by increasing the brightness. Therefore, the measurer can reliably measure the measurement object.

(4) According to the projection device of the one embodiment of the present invention, the projection device further includes, but is not limited to: a rotation angle input unit that receives an input of a rotation angle; and an image rotator that rotates the scale image by the rotation angle received by the rotation angle input unit, and causes the image projector to project the sale image rotated.

According to the above configuration, the projection device receives an input of a rotation angle, and projects the scale image that is rotated by the rotation angle received. Accordingly, a measurer can project the scale image in a desired direction. Therefore, the measure can quickly measure the measurement object.

(5) According to the projection device of the one embodiment of the present invention, the projection device further includes, but is not limited to: a brightness detector that detects information indicating a brightness; and a brightness determining unit that determines, based on the information indicating the brightness detected by the brightness detector, a brightness of the scale image to be projected by the image projector.

According to the above configuration, the projection device determines the brightness of a scale to be projected, based on the information indicating the detected brightness. Accordingly, even when the surroundings of the projection device are bright, a clear scale image can be projected onto the measurement object by increasing the brightness of the scale. Therefore, the measurer can reliably measure the measurement object.

(6) According to the projection device of the one embodiment of the present invention, the projection device further includes, but is not limited to: an imager that images the measurement object and generates image information; and a color information determining unit that determines, based on color information of the measurement object included in the image information generated by the imager, color information of the scale image to be projected by the image projector.

According to the above configuration, the projection device determines color information of a scale to be projected, based on the color information of the measurement object in the image information generated by imaging. Accordingly, a clear scale image can be projected onto the measurement object by, for example, making the color information of the scale being color information contrasted to the color information of the measurement object. Therefore, the measurer can reliably measure the measurement object.

(7) According to the projection device of the one embodiment of the present invention, the projection device further includes, but is not limited to, a measurement range input unit that receives an input of a measurement range. The image projector projects the scale image in the measurement range received by the measurement range input unit.

According to the above configuration, the projection device projects the scale image in the measurement area received. Therefore, the measurer can reliably make a measurement in a desired measurement range.

(8) According to the projection device of the one embodiment of the present invention, the projection device further includes, but is not limited to, an imager that images the measurement object and generates image information. The measurement range input unit receives the measurement range based on color information of the measurement object included in the image information generated by the imager.

According to the above configuration, the projection device receives an input of the measurement range based on the color information of the measurement object in the image information generated by imaging. Accordingly, the measurer can quickly measure the measurement object in the measurement range without inputting a measurement range.

(9) According to the projection device of the one embodiment of the present invention, the scale image is a scale image for measuring a straight length, the measurement range input unit receives specification of two measurement points, and the image projector projects the scale image between the two measurement points received by the measurement range input unit.

According to the above configuration, the projection device projects the scale image onto a region between the two measurement points received. Accordingly, a measurer can reliably measure the length between the two measurement points to be measured.

(10) According to the projection device of the one embodiment of the present invention, the projection device further includes, but is not limited to, an inter-measurement-point distance detector that detects a distance between the two measurement points received by the measurement range input unit. The image projector projects an image of information indicating the distance between the two measurement points detected by the inter-measurement-point distance detector.

According to the above configuration, the projection device projects image information indicating the detected distance between the two measurement points. Therefore, a measurer can quickly and reliably measure the length between the two measurement points.

(11) According to the projection device of the one embodiment of the present invention, the measurement range input unit receives specification of two measurement points. The projection device further includes, but is not limited to: a measurement point distance detector that detects a distance between the projection device and one of the measurement points received by the measurement range input unit, and a distance between the projection device and the other one of the measurement points; a reporting unit that reports that the distances detected by the measurement point distance detector are identical, when the distance between the projection device and the one of the measurement points received by the measurement range input unit is identical to the distance between the projection device and the other one of the measurement points.

According to the above configuration, when the detected distances to the two measurement points are identical, the projection device reports that the detected distances to the two measurement points are identical. Accordingly, the projection device can report that the scale image is to be projected in a direction perpendicular to the line connecting the two measurement points. Therefore, a measurer can recognize that the scale image without distortion due to the depth thereof in the irradiation direction is being projected.

(12) According to the projection device of the one embodiment of the present invention, the projection device further includes, but is not limited to, an imager that images a scale image projected by the image projector.

(13) One embodiment of the present invention is a projection device control method for a projection device that projects an image. The projection device control method includes, but is not limited to: a first step of the projection device detecting a distance between the projection device and a measurement object onto which the image is to be projected; and a second step of the projection device projecting a scale image in actual size onto the measurement object based on the distance detected in the first step.

(14) One embodiment of the present invention is a projection device control program that causes a computer of a projection device that projects an image to function: a distance detecting means that detects a distance between the projection device and a measurement object onto which the image is to be projected; and an image projecting means that projects a scale image in actual size onto the measurement object based on the distance detected by the distance detecting means.

Effects of the Invention

According to the present invention, the projection device detects the distance between the projection device and a measurement object onto which an image is to be projected, and projects a scale image in actual size onto the measurement object. Thereby, a measurer can quickly and reliably measure the size of the measurement object.

BEST MODE FOR CARRYING OUT THE INVENTION

First Embodiment (Outline of Function of Cell Phone Device 1)

Figure 1:
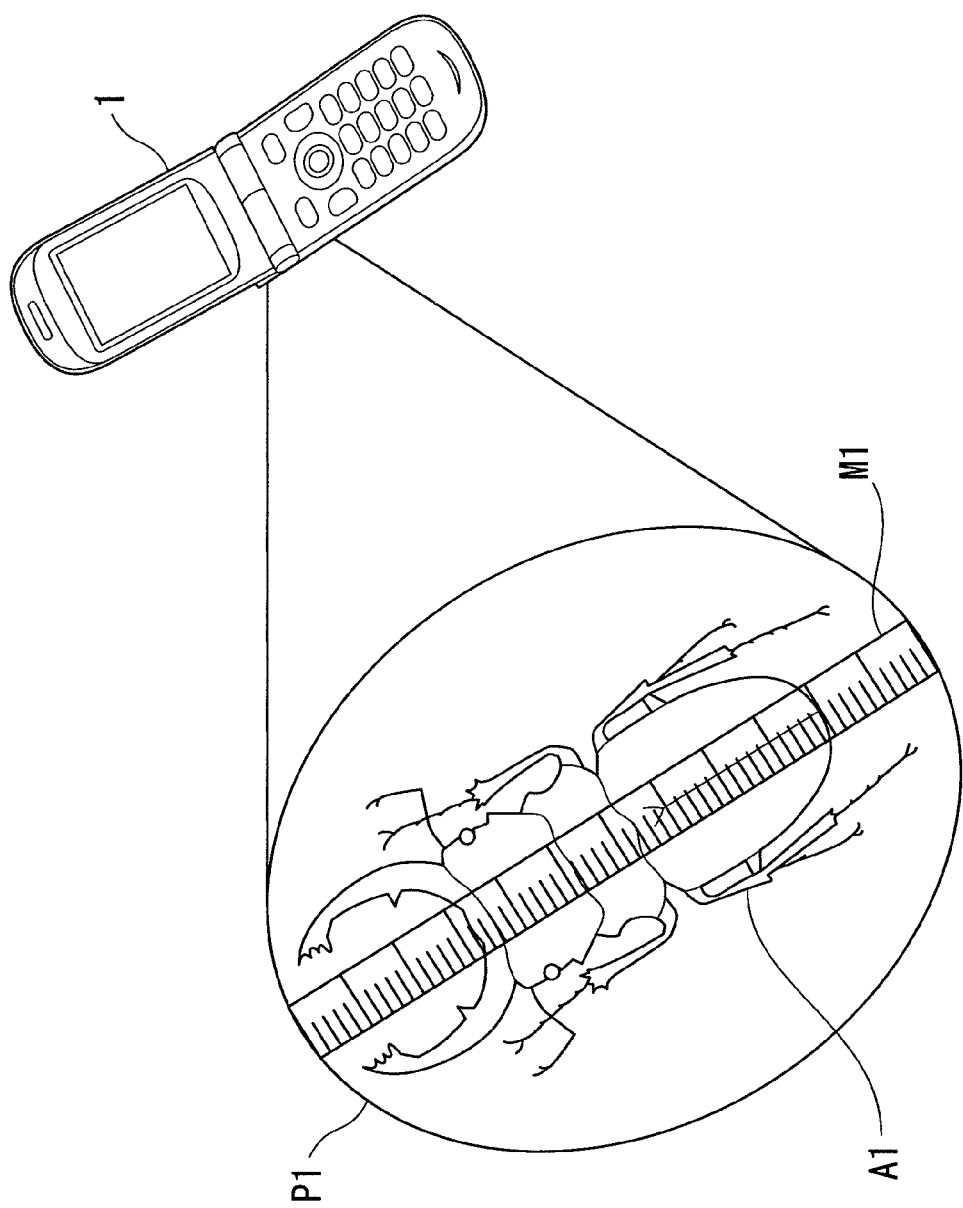
FIG. 1 is a schematic view illustrating an outline of a function of a cell phone device according to a first embodiment of the present invention.

Hereinafter, embodiments of the present invention are explained in detail with reference to the accompanying drawings. FIG. 1 is a schematic view illustrating an outline of a function of a cell phone device (projection device) 1 according to a first embodiment of the present invention.

This figure shows that the cell phone device 1 can project an image in a range P1 using a projector function of the cell phone device 1. Additionally, this figure shows that the cell phone device 1 is projecting a scale image M1 onto a measurement object A1 that is a projection target.

Thus, the scale image M1 projected from the cell phone device 1 enables simple measurement of the size of the measurement object A1.

(Outer Appearance of Cell Phone Device 1)

Figure 2A:
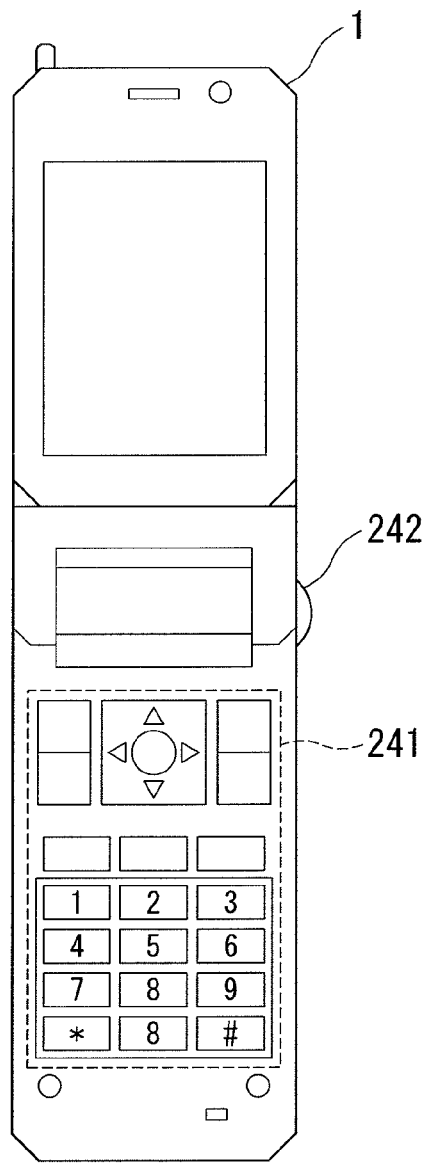
FIG. 2A is a schematic external view illustrating an outer appearance of the cell phone device according to the first embodiment.
Figure 2B:
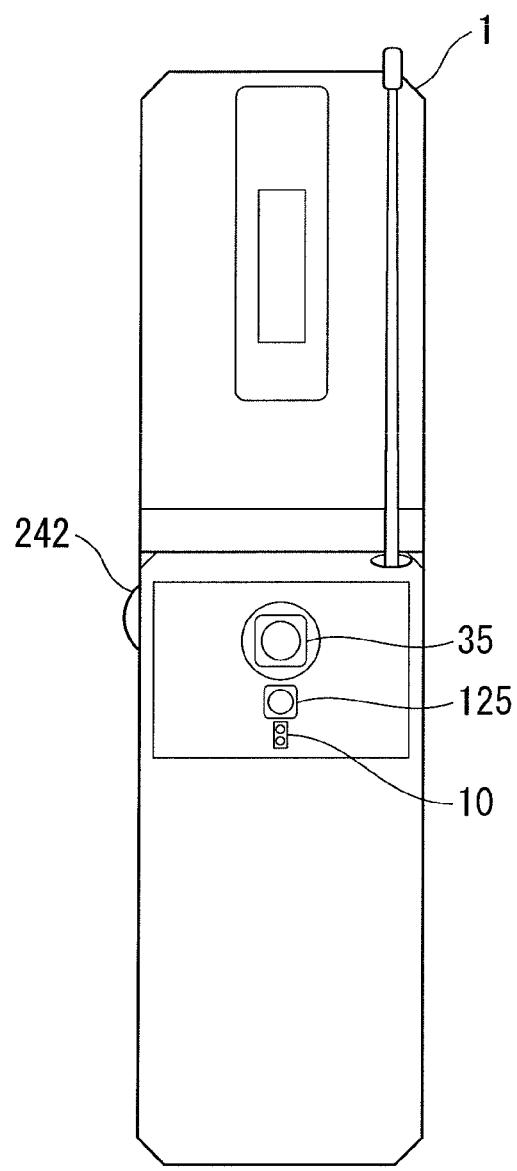
FIG. 2B is a schematic external view illustrating another outer appearance of the cell phone device according to the first embodiment.

FIGS. 2A and 2B are schematic external views illustrating outer appearances of the cell phone device 1 according to the first embodiment.

In the first embodiment, the cell phone device 1 is a clamshell cell phone device, and has a function of a projection device. FIG. 2A is an external view illustrating an inner appearance of the cell phone device 1 that is open. FIG. 2B is an external view illustrating an outer appearance of the cell phone device 1 that is open.

FIG. 2A shows that the cell phone device 1 includes a key input unit 241 including numeric key pads and the like, and a jog dial 242 that is a rotatable selector. The cell phone device 1 receives an input of information by pressing of the key of the key input unit 241 and rotation of the jog dial 242.

FIG. 2B shows that the cell phone device 1 includes: an imager 35; a projector optical unit 125 that irradiates an image to be projected; and a distance detector 10 that detects the distance to a measurement object by transmission and reception of an electric wave. The projector optical unit 125 is positioned adjacent to the distance detector 10. The units 10 and 125 can be assumed to be positioned at the same position for calculation and the like explained in the present specification. The distance detector 10 may detect the distance by emitting and receiving a light, for example, by emitting a laser light and receiving a reflected light.

(Configuration of Cell Phone Device 1)

Figure 3:
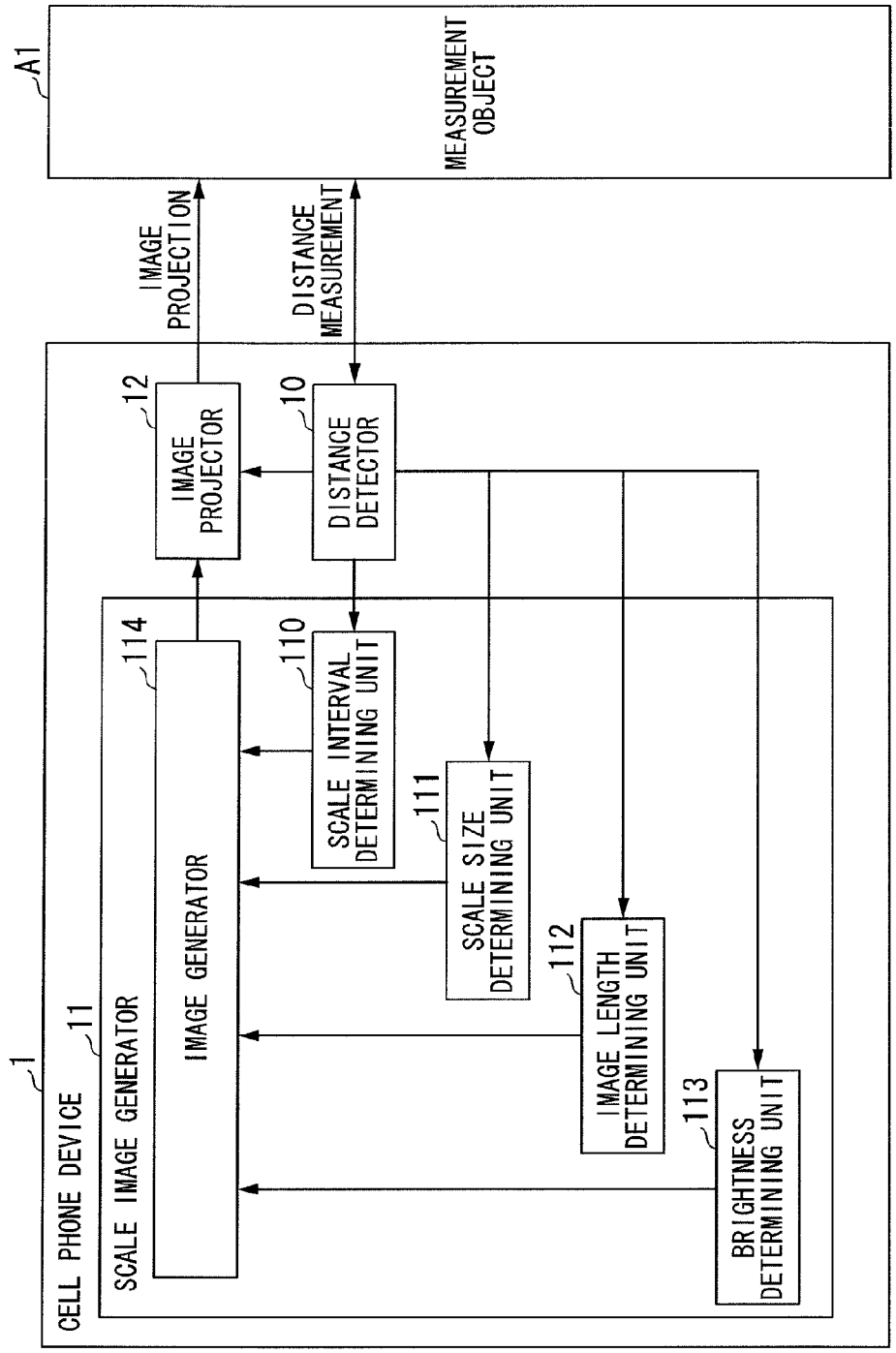
FIG. 3 is a schematic block diagram illustrating a configuration of the cell phone device according to the first embodiment.

FIG. 3 is a schematic block diagram illustrating a configuration of the cell phone device 1 according to the first embodiment.

The cell phone device 1 includes the distance detector 10, a scale image generator 11, and an image projector 12. This figure shows that the distance detector 10 measures the distance between the cell phone device 1 and the measurement object A1, and that the image projector 12 projects an image onto the measurement object A1.

FIG. 3 illustrates only the schematic configuration of the cell phone device (projection device) 1 related to explanations of the first embodiment.

The distance detector 10 transmits and receives a burst electric wave (for example, infrared ray), multiplies the speed of the electric wave by a time difference between a time of emitting the electric wave and a time of receiving a wave reflected from the measurement object A1, and thereby detects the distance to the measurement object A1. A method of detecting the distance to the distance detector 10 is not limited thereto, and another method may be used.

The distance detector 10 outputs, to the scale image generator 11 and the image projector 12, information concerning the detected distance to the measurement object A1.

The scale image generator 11 generates a scale image based on the distance to the measurement object A1 that is the information received from the distance detector 10. Then, the scale image generator 11 outputs the scale image generated to the image projector 12. The details of the scale image generator 11 will be explained later.

The image projector 12 projects the scale image received from the scale image generator 11 onto the measurement object. In other words, the image projector 12 projects, based on the distance detected by the distance detector 10, a scale image for measuring the size of the measurement object A1.

(Scale Image Generator 11)

The scale image generator 11 includes: a scale interval determining unit 110; a scale size determining unit 111; an image length determining unit 112; a brightness determining unit 113; and an image generator 114.

The scale interval determining unit 110 reads out the relationship between the distance previously stored in a storing unit thereof (not shown) and an interval at which scale marks on the scale are spaced (hereinafter, scale interval). Then, the scale interval determining unit 110 determines, as a scale interval of the scale image to be projected by the image projector 12, the scale interval corresponding to the distance to the measurement object A1 that is the information received from the distance detector 10. In other words, the scale interval determining unit 110 determines, based on the distance detected by the distance detector 10, a scale interval of an image to be projected by the image projector 12.

For example, the scale interval determining unit 110 correlates the distance of 0 cm to 20 cm, the distance of 20 cm to 30 cm, the distance of 30 cm or more to the scale interval of 0.1 cm, the scale interval of 0.5 cm, and the scale interval of 1 cm, respectively, and then stores these correlations. In this case, when the distance to the measurement object A1 is 10 cm (or 35 cm), the scale interval determining unit 110 determines the scale interval as 0.1 cm (or 1 cm).

The scale interval determining unit 110 outputs information concerning the scale interval determined to the image generator 114.

The scale size determining unit 111 reads out the relationship between the distance previously stored in a storing unit thereof (not shown) and the scale size of the scale image. Then, the scale size determining unit 111 determines, as the scale size of the scale image generated by the scale image generator 11, the scale size of the scale image corresponding to the distance to the measurement object A1 that is the information received from the distance detector 10.

The relationship between the distance and the scale size of the scale image is the relationship that is predetermined based on the property (spreading or focusing) of a lens of the projector optical unit 125, and the relationship that is determined such that the scale image increased or reduced in size by the lens indicates the correct length (actual size) at the point of the measurement object A1.

The scale size determining unit 111 outputs information concerning the determined scale size of the scale image to the image generator 114.

The image length determining unit 112 reads out the relationship between the distance previously stored in a storing unit thereof (not shown) and the length of the scale image. Then, the image length determining unit 112 determines, as the length of the scale image generated by the scale image generator 11, the length of the scale image corresponding to the distance to the measurement object A1.

The scale length determining unit 112 outputs information concerning the determined length of the scale image to the image generator 114.

The brightness determining unit 113 reads out the relationship between the distance previously stored in a storing unit thereof (not shown) and information indicating the strength of an irradiation light with which the image projector 12 projects the scale image. Then, the brightness determining unit 113 determines information indicating the strength of the irradiation light corresponding to the distance to the measurement object A1 that is the information received from the distance detector 10.

The illuminance, which is the information indicating the brightness of the scale image projected, varies according to the strength of the irradiation light. In other words, the brightness determining unit 113 determines, based on the distance detected by the distance detector 10, information indicating the brightness of the image to be projected by the image projector 12.

The relationship between the distance and the information indicating the strength of the irradiation light is a relationship such that the larger the distance becomes, the higher the strength of the irradiation light becomes. Accordingly, for example, even if the distance to the measurement object A1 varies, the illuminance at the point of the measurement object A1 can be maintained at a level at which the image can be recognized.

The brightness determining unit 113 outputs information indicating the determined strength of the irradiation light to the image generator 114.

The image generator 114 generates scale image information with the scale size corresponding to the information received from the scale size determining unit 111. Then, the image generator 114 deletes part of scale marks on the scale image information generated, and thereby changes the scale image information generated to the scale image information with the scale marks spaced at the scale interval corresponding to the information received from the scale interval determining unit 110. Then, the image generator 114 deletes both side portions of the scale image information changed, and thereby changes the scale image information generated to the scale image information with the length corresponding to the information received from the image length determining unit 112.

The image generator 114 outputs, to the image projector 12, the scale image information generated in this manner and the information indicating the strength of the irradiation light which is received from the brightness determining unit 113.

(Image Projector 12)

Hereinafter, a configuration of the image projector 12 is explained in detail.

Figure 4:
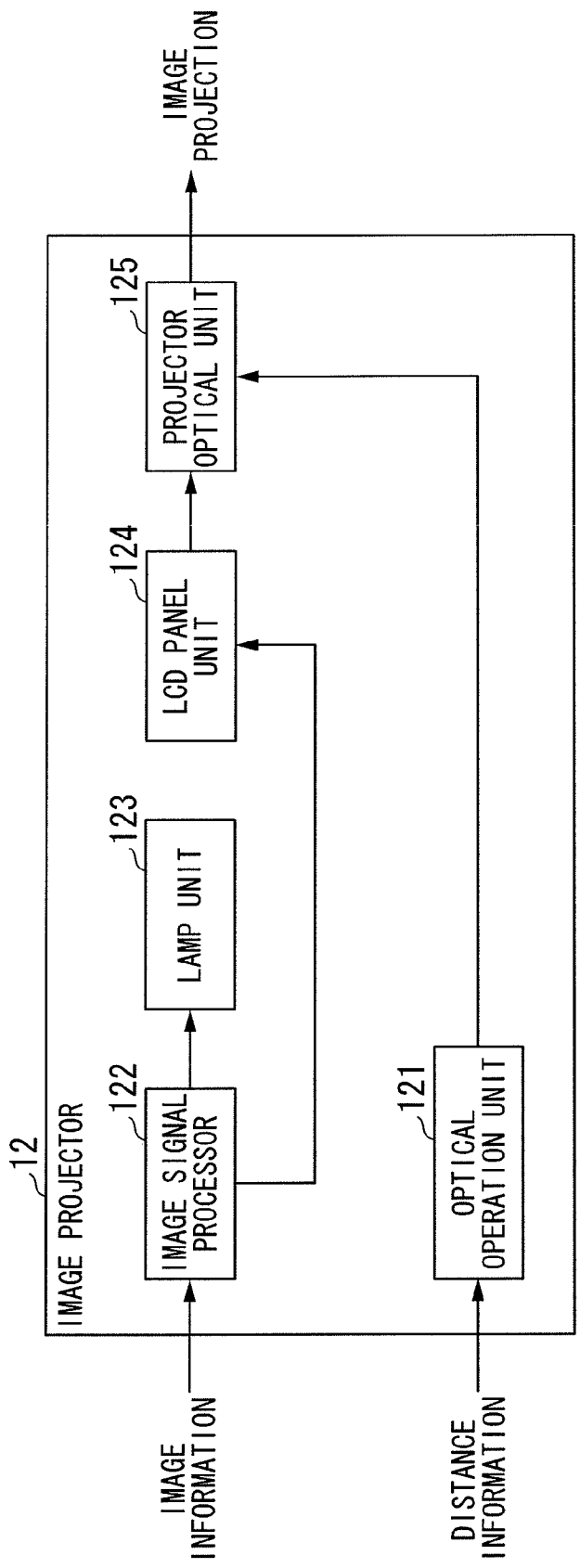
FIG. 4 is a schematic block diagram illustrating a configuration of an image projector according to the first embodiment.

FIG. 4 is a schematic block diagram illustrating a configuration of the image projector 12 according to the first embodiment.

The image projector 12 includes: an optical operation unit 121; an image signal processor 122; a lamp unit 123; an LCD (Liquid Crystal Display) panel (liquid crystal panel) 124; and a projector optical unit 125.

Based on the distance to the measurement object A1 that is the information received from the distance detector 10, the optical operation unit 121 controls a focus of the lens of the projector optical unit 125 so that the image projected from the projector optical unit 125 becomes clear at the point of the measurement object A1.

The image signal processor 122 outputs the information indicating the strength of the irradiation light which is received from the image generator 114. Additionally, the image signal processor 122 converts the scale image received from the image generator 114 into an image signal to be displayed on the LCD panel, and outputs the image signal to the LCD panel unit 124.

The lamp unit 123 includes an illuminator, such as a lamp, and emits an irradiation light with the strength corresponding to the information received from the image signal processor 122.

The LCD panel unit 124 includes a liquid crystal panel, and displays, on the liquid crystal panel, an image of the image signal received from the image signal processor 122.

The projector optical unit 125 includes an optical lens.

By such a configuration of the image projector 12, the image displayed on the liquid crystal panel of the LCD panel unit 124 is projected by the light emitted from the illuminator of the lamp unit 123 onto the measurement object A1 via the optical lens of the projector optical unit 125.

In the first embodiment, the lamp unit 123 emits an irradiation light with the strength corresponding to the information received from the image signal processor 122, and adjusts the brightness of the image to be projected by the image projector 12. However, the present invention is not limited thereto. For example, the lamp unit 123 may emit, from the illuminator, a light with a constant strength. Based on the information received from the image signal processor 122, the LCD panel unit 124 may control the transmitted amount of light emitted from the lamp unit 123 to control the brightness of an image to be projected by the image projector 12.

Although the case, in which the image projector 12 is a liquid crystal projector, has been explained in the first embodiment, the present invention is not limited thereto. The image projector 12 may be a projector employing another method, such as a CRT (Cathode Ray Tube) projector.

(Operation of Cell Phone Device 1)

Hereinafter, operation of the cell phone device 1 is explained.

Figure 5:
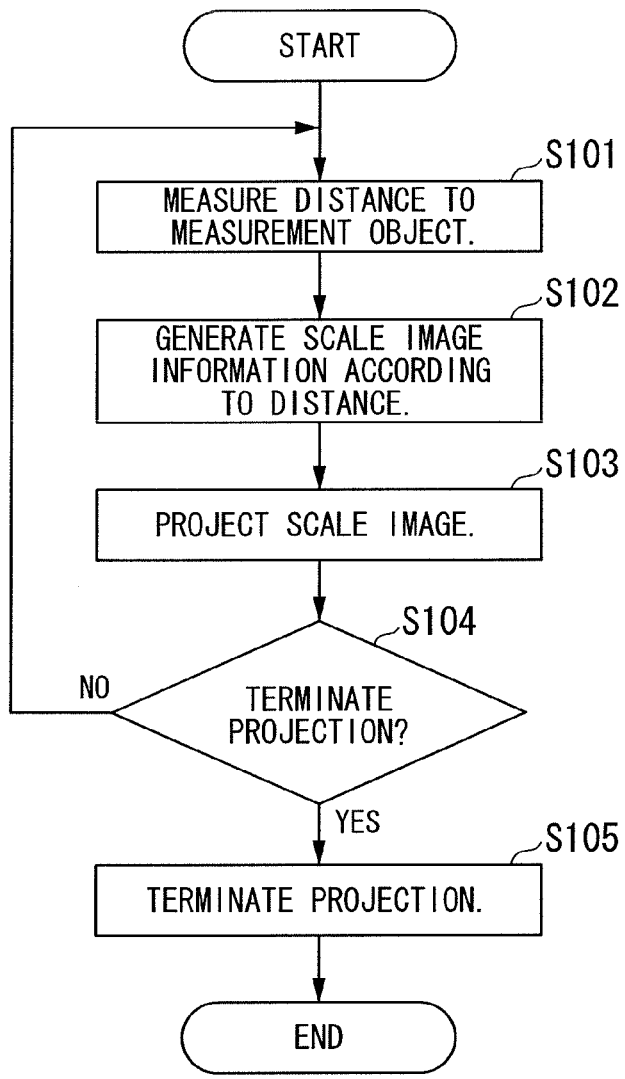
FIG. 5 is a flowchart illustrating operation of the cell phone device according to the first embodiment.

FIG. 5 is a flowchart illustrating operation of the cell phone device 1 according to the first embodiment.

(Step S101) The cell phone device 1 detects the distance to the measurement object A1. Then, the routine proceeds to step S102.

(Step S102) The cell phone device 1 generates a scale image with the scale interval, the scale size, and the length, which are determined based on the distance to the measurement object A1 detected in step S101. Then, the routine proceeds to step S103.

(Step S103) The cell phone device 1 projects the scale image generated in step S103. At this time, the cell phone device 1 projects the scale image with the strength of the irradiation light according to the distance to the measurement object A1 detected in step S101. Then, the routine proceeds to step S104.

(Step S104) The cell phone device 1 determines whether or not an order to terminate the projection has been input by an operation of a user of the cell phone device 1. When the cell phone device 1 determines that the order to terminate the projection has been input (YES), the routine proceeds to step S105. On the other hand, when the cell phone device 1 determines that the order to terminate the projection has not been input (YES), the routine proceeds to step S101.

Although the order to terminate the projection is input by an operation of the user of the cell phone device 1 in step S104, the configuration of the present invention is not limited thereto. For example, the cell phone device 1 may include a time measuring unit so as to determine that the order to terminate the projection has been input when a predetermined time elapses.

(Step S105) The cell phone device 1 terminates the projection of the scale image.

As explained above, according to the first embodiment, the cell phone device 1 detects the distance between the cell phone device 1 and the measurement object A1, and projects a scale image in actual size onto the measurement object A1. Accordingly, a measurer can quickly and reliably measure the size of the measurement object A1.

Additionally, according to the first embodiment, the cell phone device 1 determines a scale interval of a scale image to be projected, based on the detected distance between the cell phone device 1 and the measurement object A1. Accordingly, for example, when the size of a small measurement object is measured, a measurer of the cell phone device 1 can make a distance between the cell phone device 1 and the measurement object A1 smaller so that a scale in small size (for example, one millimeter) is projected on the measurement object A1. Thereby, the measurer can quickly and reliably measure the measurement object.

Further, according to the first embodiment, the cell phone device 1 determines the brightness of a scale to be projected, based on the detected distance between the cell phone device 1 and the measurement object A1. Accordingly, even when the measurement object A1 far distanced from the cell phone device 1 is measured, the cell phone device 1 can project a clear scale image onto the measurement object A1 by increasing the brightness of the scale. Thereby, the measurer can reliably measure the measurement object.

Second Embodiment

Hereinafter, a second embodiment of the present invention is explained in detail with reference to the accompanying drawings. A cell phone device 2 of the second embodiment has a function of translating or rotating a scale image, in addition to the functions of the cell phone device 1 of the first embodiment. The cell phone device 2 has a function of detecting the brightness, and thereby determining the brightness of the scale image based on the detected brightness.

Although the function of rotating a scale image is explained in the second embodiment, the function of translating the scale image may be included. Further, the cell phone device 2 may have both functions of rotating and translating the scale image. The outer appearance of the cell phone device 2 is the same as that of the cell phone device 1 (shown in FIGS. 2A and 2B).

(Configuration of Cell Phone Device 2)

Figure 6:
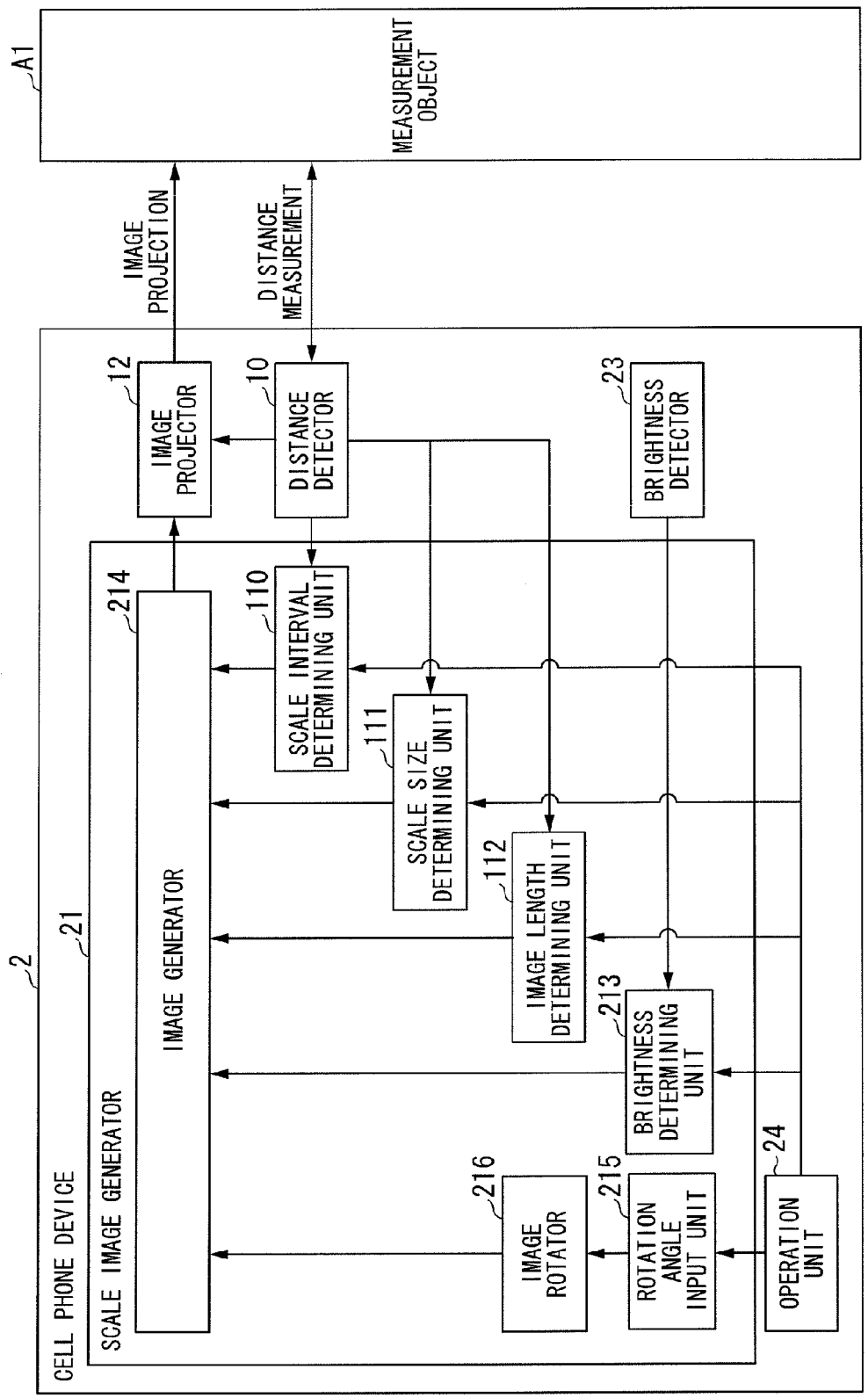
FIG. 6 is a schematic block diagram illustrating a configuration of a cell phone device according to a second embodiment of the present invention.

FIG. 6 is a schematic block diagram illustrating a configuration of a cell phone device 2 according to a second embodiment of the present invention.

When the cell phone device 2 of the second embodiment (shown in FIG. 6) is compared to the cell phone device 1 of the first embodiment (shown in FIG. 3), a brightness detector 23, an operation unit 24, a brightness determining unit 213, an image generator 214, a rotation angle input unit 215, and an image rotator 216 differ. However, other constituent elements (the distance detector 10, the scale interval determining unit 110, the scale size determining unit 111, the image length determining unit 112, and the image projector 12) have the same functions as those of the first embodiments. Therefore, explanations of the same functions as of the first embodiment are omitted here.

FIG. 6 shows only a schematic configuration related to explanations of the second embodiment.

The brightness detector 23 detects the brightness of the surroundings. The brightness detector 23 outputs information concerning the detected brightness to the brightness determining unit 213.

The brightness determining unit 213 reads out the relationship between information concerning the brightness previously stored in a storing unit thereof (not shown) and information indicating the strength of an irradiation light with which the image projector 12 projects a scale image. Then, the brightness determining unit 213 determines information indicating the brightness of the irradiation light corresponding to the information concerning the brightness which is received from the brightness detector 23.

The relationship between the information concerning the brightness and the information indicating the strength of the irradiation light with which the image projector 12 projects a scale image is a relationship such that the brighter the surroundings become, the higher the strength of the irradiation light becomes.

The brightness determining unit 213 outputs information indicating the determined strength of the irradiation light to the image generator 214.

The operation unit 24 includes a key input unit 241 including numeric key pads and the like, and the jog dial 242 that is a rotatable selector. The operation unit 24 outputs, to the rotation angle input unit 215, operation information input by an operator of the cell phone 2 operating the key input unit 241 or the jog dial 242.

The operation unit 24 outputs operation information input by an operator of the cell phone 2 operating the key input unit 241 or the jog dial 242 to the scale interval determining unit 110, the scale size determining unit 111, the image length determining unit 112, or the brightness determining unit 213. Based on the operation information received from the operation unit 23, the scale interval determining unit 110, the scale size determining unit 111, the image length determining unit 112, or the brightness determining unit 213 outputs, to the image generator 214, information concerning the scale interval of the scale image, the scale size of the scale image, the length of the scale image, or the brightness of the scale image, respectively, which are changed based on the operation information received from the operation unit 24. When the cell phone device 2 displays, on the scale image, a number or the like every scale unit (every 1 millimeter, every 5 millimeter, every 1 centimeter, and the like), the scale unit by which a number or the like is displayed, may be changed based on the operation information received by the operation unit 24. Additionally, the cell phone device 2 may change a color of the scale image based on the operation information received by the operation unit 24, and generate a scale image, the color of which is changed.

The rotation angle input unit 215 receives an input of a rotation angle of the scale image based on operation information input via the operation unit 24. For example, the rotation angle input unit 215 receives, as the rotation angle of the scale image, a rotation angle of the jog dial 242 that is rotated by an operation of an operator. The rotation angle input unit 215 outputs information concerning the received rotation angle to the image rotator 216.

The image rotator 216 controls the image generator 214 to rotate the image generated by the image generator 214 by the rotation angle received from the rotation angle input unit 215.

The image generator 214 generates scale image information with the scale size corresponding to the information received from the scale size determining unit 111. Then, the image generator 214 deletes part of scale marks on the scale image information generated, and thus changes the scale image information generated to scale image information with the scale marks spaced at the scale interval corresponding to the information received from the scale interval determining unit 110. Then, the image generator 214 deletes both side portions of the scale image information changed, and thus changes the scale image information changed to scale image information with the length corresponding to the information received from the image length determining unit 112. Then, the image generator 214 rotates the scale image information under the control of the image rotator 216 to change the scale image information changed.

The image generator 214 outputs, to the image projector 12, the scale image information generated in this manner and the information indicating the strength of the irradiation light which is received from the brightness determining unit 213.

(Operation of Cell Phone Device 2)

Hereinafter, operation of the cell phone device 2 is explained.

Figure 7:
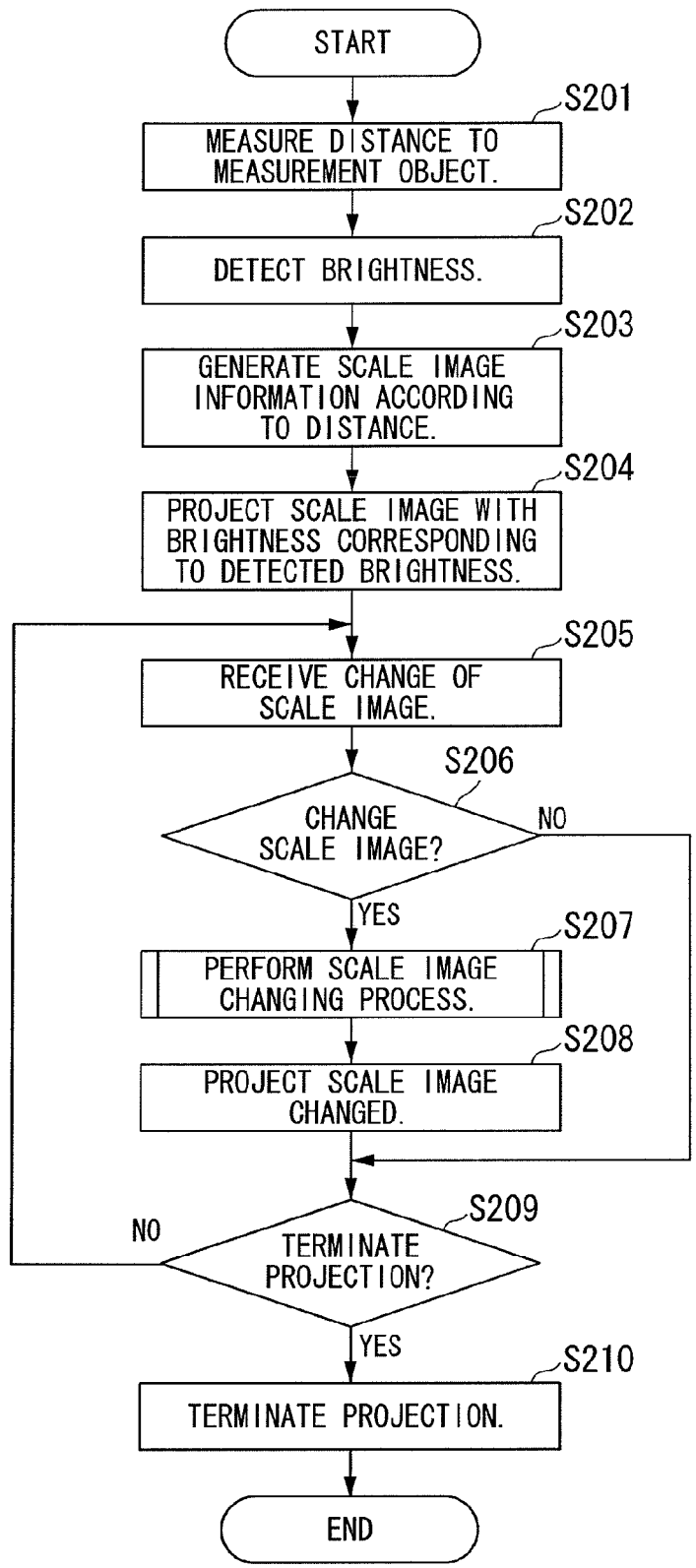
FIG. 7 is a flowchart illustrating operation of the cell phone device according to the second embodiment.

FIG. 7 is a flowchart illustrating operation of the cell phone device 2 according to the second embodiment.

(Step S201) The cell phone device 2 detects the distance to the measurement object A1. Then, the routine proceeds to step S202.

(Step S202) The cell phone device 2 detects the brightness of the surroundings of the cell phone device 2. Then, the routine proceeds to step S203.

(Step S203) The cell phone device 2 generates a scale image with the scale interval, the scale size, and the length which are determined according to the distance to the measurement object A1 detected in step S201. Then, the routine proceeds to step S204.

(Step S204) The cell phone device 2 projects the scale image generated in step S203. At this time, the cell phone device 2 projects the scale image at the strength of the irradiation light according to the brightness detected in step S202. Then, the routine proceeds to step S205.

(Step S205) The cell phone device 2 receives an operation to change of the scale image. For example, the cell phone device 2 displays an image for selecting an operation to rotate the scale image, an image for selecting an operation to change the scale unit, an image for selecting an operation to change the scale interval, an image for selecting an operation to change the length of the scale image, and an image for selecting an operation to change the brightness or color of the scale image. Then, the cell phone device 2 has an operator of the cell phone device 2 select one of the images displayed. Then, the routine proceeds to step S206.

(Step S206) The cell phone device 2 determines whether or not an input of the operation to change the scale image has been received. When the cell phone device 2 determines that an input of the operation to change the scale image has been received (YES), the routine proceeds to step S207. On the other hand, when the cell phone device 2 determines that an input of the operation to change the scale image has not been received (NO), the routine proceeds to step S209.

(Step S206) The cell phone device 2 changes the scale image projected in step S204 to the image according to the operation to change the scale image which is received in step S205. The detailed operation of changing the scale image (hereinafter, scale image changing process) will be explained later. Then, the routine proceeds to step S208.

(Step S208) The cell phone device 2 projects the scale image changed in step S207. Then, the routine proceeds to step S209.

(Step S209) The cell phone device 2 determines whether or not an order to terminate the projection has been received by an operation of the operator of the cell phone device 2. When the cell phone device 2 determines that an order to terminate the projection has been received (YES), the routine proceeds to step S210. On the other hand, when the cell phone device 2 determines that an order to terminate the projection has not been received (NO), the routine proceeds to step S205.

(Step S210) The cell phone device 2 terminates the projection of the scale image.

(Operation of Scale Image Changing Process)

Hereinafter, operation of the scale image changing process in step S206 shown in FIG. 7 is explained.

Figure 8:
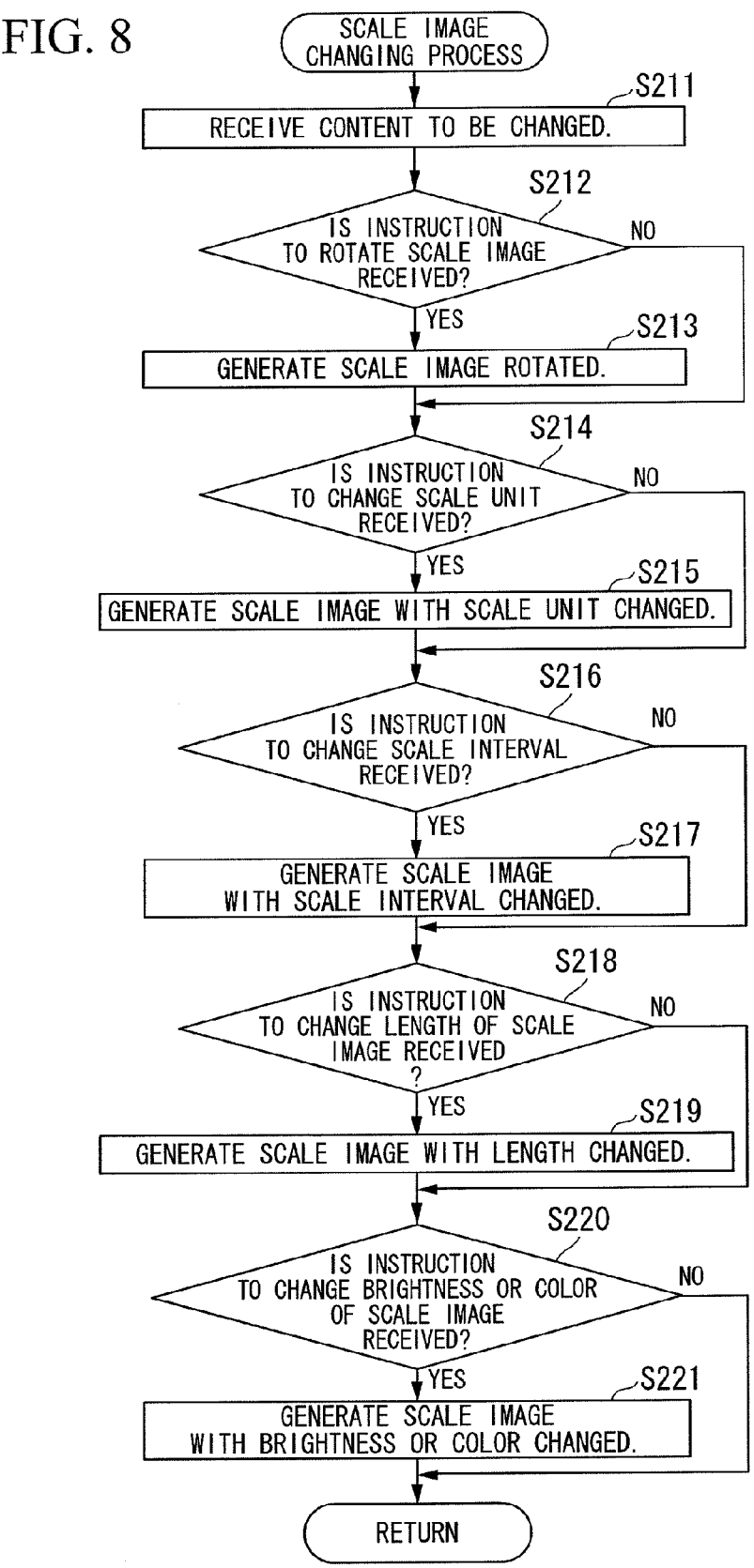
FIG. 8 is a flowchart illustrating operation of a scale image changing process according to the second embodiment.

FIG. 8 is a flowchart illustrating operation of the scale image changing process according to the second embodiment.

(Step S211) The cell phone device 2 receives a content of the scale image to be changed through an operation of the operator of the cell phone device 2.

(Step S212) The cell phone device 2 determines whether or not an operation to rotate the scale image has been received. When the cell phone device 2 determines that an operation to rotate the scale image has been received (YES), the routine proceeds to step S213. On the other hand, when the cell phone device 2 determines that an operation to rotate the scale image has not been received (NO), the routine proceeds to step S214.

(Step S213) The cell phone device 2 generates a scale image that is rotated by the rotation angle received in step S212.

(Step S214) When the cell phone device 2 displays a number or the like on the scale image every scale unit, the cell phone device 2 determines whether or not an operation to change the scale unit has been received. When the cell phone device 2 determines that an operation to change the scale unit has been received (YES), the routine proceeds to step S215. On the other hand, when the cell phone device 2 determines that an operation to change the scale unit has not been received (NO), the routine proceeds to step S216.

(Step S215) The cell phone device 2 generates a scale image that is changed such that a number or the like is added and displayed every scale unit received in step S214.

(Step S216) The cell phone device 2 determines whether or not an operation to change the scale interval has been received in step S211. When the cell phone device 2 determines that an operation to change the scale interval has been received (YES), the routine proceeds to step S217. On the other hand, when the cell phone device 2 determines that an operation to change the scale interval has not been received (NO), the routine proceeds to step S218.

(Step S217) The cell phone device 2 generates a scale image, the scale interval of which has been changed to the scale interval received in step S216.

(Step S218) The cell phone device 2 determines whether or not an operation to change the length of the scale image has been received in step S211. When the cell phone device 2 determines that an operation to change the length of the scale image has been received (YES), the routine proceeds to step S219. On the other hand, when the cell phone device 2 determines that an operation to change the length of the scale image has not been received (NO), the routine proceeds to step S220.

(Step S219) The cell phone device 2 generates a scale image, the length of which has been changed to the length received in step S218.

(Step S220) The cell phone device 2 determines whether or not an operation to change the brightness or color of the scale image has been received in step S211. When the cell phone device 2 determines that an operation to change the brightness or color of the scale image has been received (YES), this process ends. On the other hand, when the cell phone device 2 determines that an operation to change the brightness or color of the scale image has not been received (NO), the routine proceeds to step S221.

(Step S221) The cell phone device 2 generates a scale image, the brightness or color of which has been changed to the brightness or color received in step S220.

Although the scale image generating process, the scale image projecting process, and the scale image changing process have been explained in the second embodiment, the present invention is not limited thereto. The cell phone device 2 may perform the scale image generating process and the scale image projecting process on two or more scale images, and rotate each scale image by the scale image changing process. In this case, for example, the cell phone device 2 may display an angle at which two scale images cross each other.

When a number or the like is added and displayed on a scale image every scale unit, the cell phone device 2 may change the reference point from which numbers or the like are added and displayed (for example, the zero point when a number is added).

As explained above, according to the second embodiment, the cell phone device 2 receives an input of a rotation angle, and projects a scale image that is rotated by the rotation angle received. Accordingly, the cell phone device 2 can project a scale image in a direction in which a measurer wants to make a measurement. Thereby, the measurer can quickly measure the measurement object A1.

Additionally, according to the second embodiment, the cell phone device 2 determines the brightness of a scale to be projected, based on the information concerning the detected brightness. Accordingly, for example, when the surroundings of the cell phone device 2 are bright, the cell phone device 2 increases the brightness of the scale, and thereby can project a clear scale image onto the measurement object. Therefore, the measurer can reliably measure the measurement object.

Third Embodiment

Hereinafter, a third embodiment of the present invention is explained in detail with reference to the accompanying drawings. A cell phone device 3 of the third embodiment includes an imaging function, and determines a measurement range in which a scale image is projected and color information of the scale image based on image information of the imaged image.

An outer appearance of the cell phone device 3 is equal to that of the cell phone device 1 (shown in FIGS. 2A and 2B).

(Outline of Function of Cell Phone Device 3)

Figure 9:
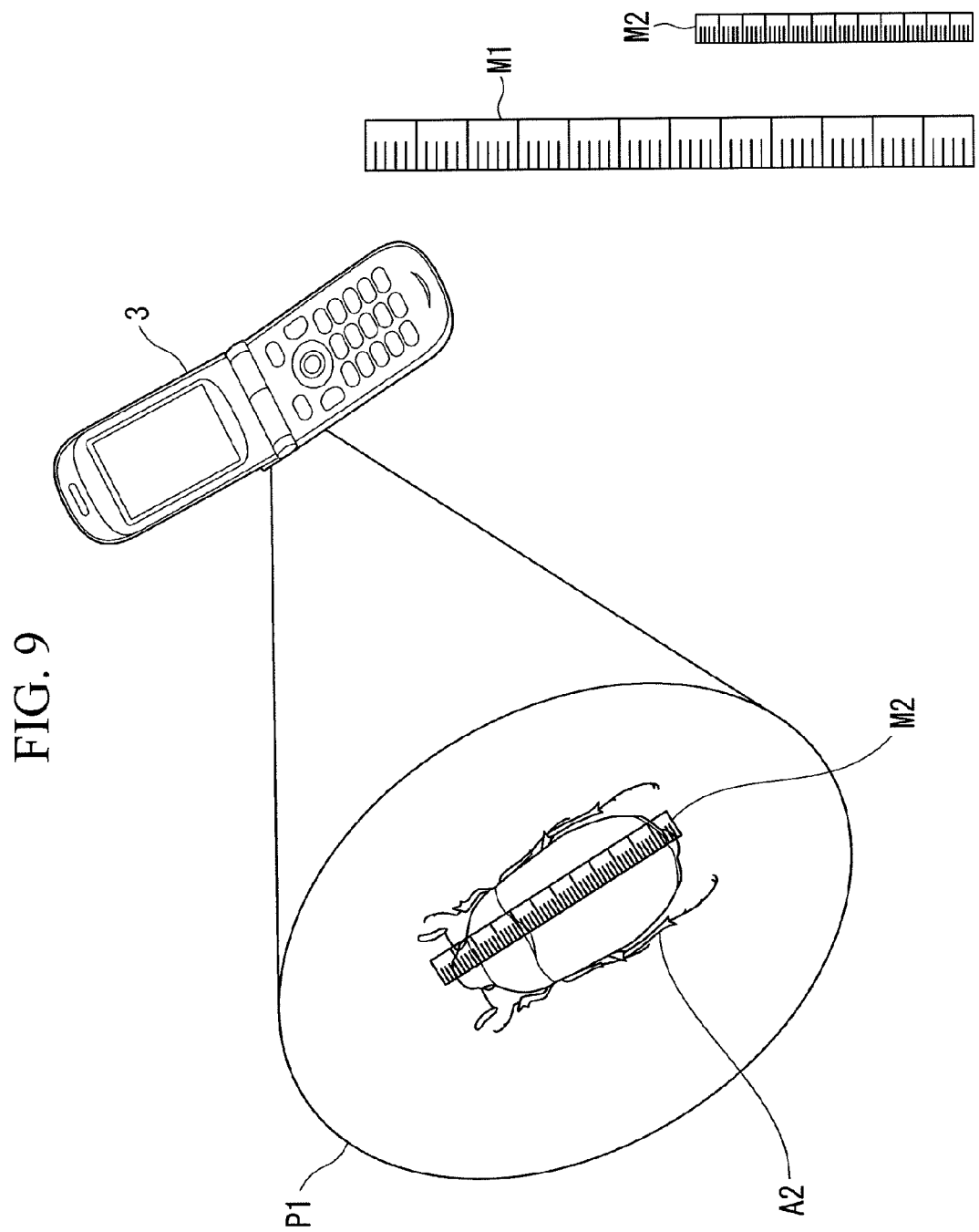
FIG. 9 is a schematic view illustrating an outline of a configuration of a cell phone device according to a third embodiment of the present invention.

Hereinafter, the third embodiment of the prevent invention is explained in detail with reference to the accompanying drawings. FIG. 9 is a schematic view illustrating a configuration of the cell phone device 3 according to the third embodiment of the present invention.

This figure shows that the cell phone device 3 can project, using a projecting function of the cell phone device 3, an image in the same range as the range P1 (shown in FIG. 1) of the first embodiment. Additionally, this figure shows that the cell phone device 3 is projecting a scale image M2 onto a measurement object A2 that is the projection target.

Further, this figure shows that the length of the measurement object A2 is substantially half the diameter of the range P1, that the length of the image M2 projected by the cell phone device 3 is half the length of the image M1 shown in FIG. 1, and that the scale interval is also halved.

In other words, this figure shows that the cell phone device 3 detects the size of the measurement object A2, and projects a scale image according to the detected size.

(Configuration of Cell Phone Device 3)

Figure 10:
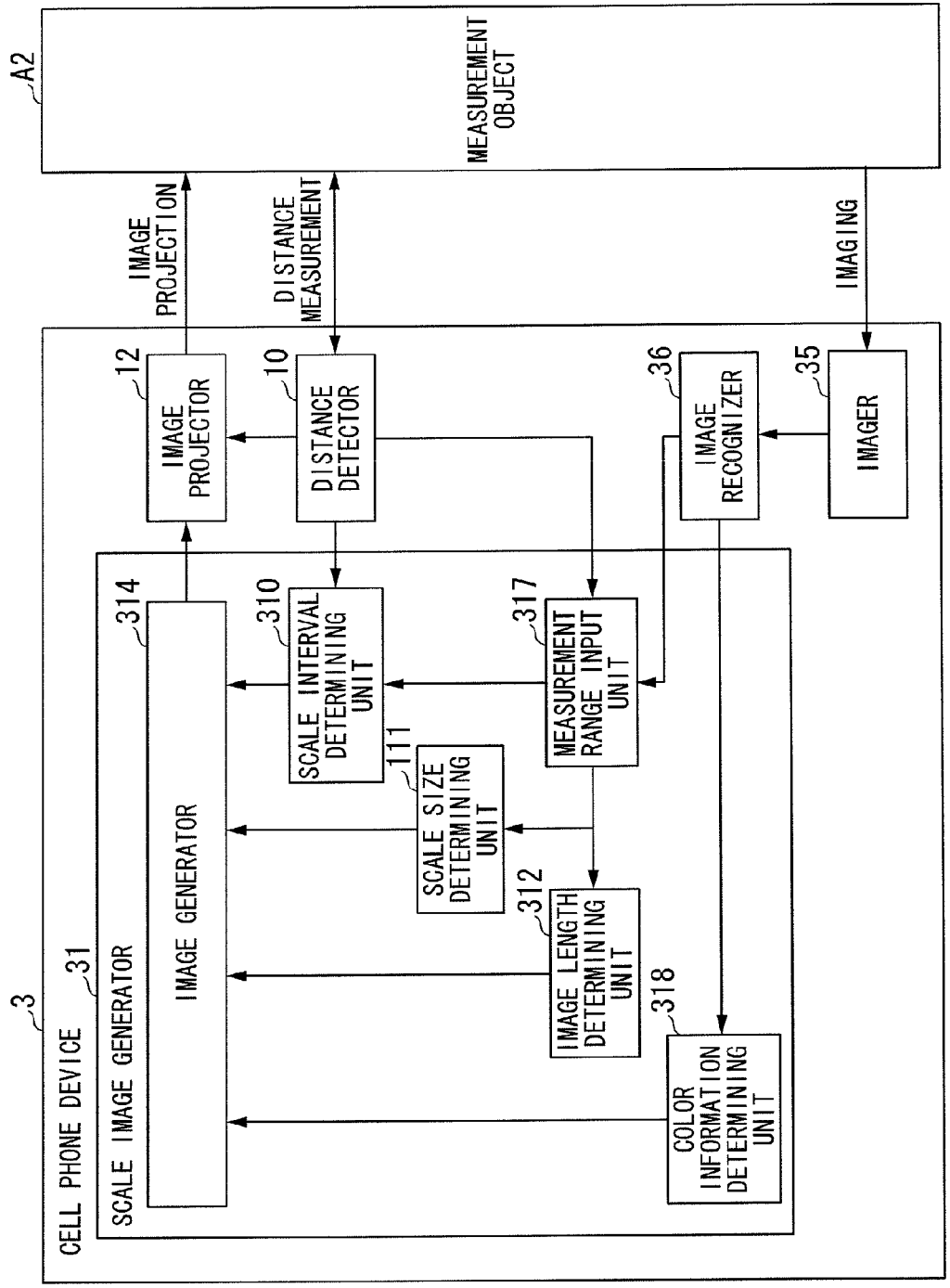
FIG. 10 is a schematic block diagram illustrating a configuration of the cell phone device according to the third embodiment.

FIG. 10 is a schematic block diagram illustrating a configuration of the cell phone device 3 according to the third embodiment.

When the cell phone device 3 of the third embodiment (shown in FIG. 10) is compared to the cell phone device 1 of the first embodiment (shown in FIG. 3), different elements are an imager 35, an image recognizer 36, a scale interval determining unit 310, an image length determining unit 312, an image generator 314, a measurement range input unit 317, and a color information determining unit 318. However, other constituent elements (the distance detector 10, the image projector 12, and the scale size determining unit 111) have the same functions as those of the first embodiment, and therefore explanations of the same functions as of the first embodiment are omitted hereinafter.

FIG. 10 shows only a schematic configuration related to explanations of the third embodiment.

The imager 35 images the measurement object A2, and generates image information. The imager 35 outputs the image information generated to the image recognizer 36.

The image recognizer 36 performs an image recognizing process on the image of the image information received from the imager 35, and detects length information of the measurement object A2, color information of the measurement object A2 (such as hue, brightness, and saturation), and the like. For example, the image recognizer 36 extracts a periphery of the measurement object A2 based on the difference in color information of the image, and approximates the periphery by a rectangle. Then, the image recognizer 36 detects the length of one side of the rectangle as the length of the measurement object A2. The image recognizer 36 may detect the length of the measurement object A2 based on the color information of the surroundings of the measurement object A2.

The image recognizer 36 outputs information concerning the detected length of the measurement object A2 to the measurement range input unit 317. Additionally, the image recognizer 36 outputs the extracted color information of the measurement object A2 to the color information determining unit 318.

The measurement range input unit 317 outputs the distance to the measurement object A1 that is the information received from the distance detector 10, to the scale interval determining unit 310, the scale size determining unit 111, and the image length determining unit 312. Additionally, the measurement range input unit 317 outputs, to the image length determining unit 312, the information concerning the length of the measurement object A2 which is received from the image recognizer 36.

The scale interval determining unit 310 reads out the relationship between the distance previously stored in a storing unit thereof (not shown) and a scale interval. Then, the scale interval determining unit 310 selects a scale interval corresponding to the distance to the measurement object A1 that is the information received from the distance detector 10. The scale interval selected is an interval when the length of the measurement object is substantially the same as the diameter of the range P1 shown in FIG. 1.

For example, the scale interval selected by the scale interval determining unit 310 is the interval shown on the image M1 shown in FIG. 1.

Then, the scale interval determining unit 310 subtracts the diameter of the range P1 from the length of the measurement object A2 that is the information received from the distance detector 10. The scale interval determining unit 310 determines, as a scale interval of the scale image to be projected by the image projector 12, a scale interval obtained by multiplying the scale interval selected by the result of the subtraction.

For example, when the length of the measurement object A2 is half the diameter of the range P1, and the selected image is the image M1 shown in FIG. 1, the scale interval becomes half the scale interval of the image M1 as the image M2 shown in FIG. 9.

The scale interval determining unit 310 outputs information concerning the determined scale interval to the image generator 314.

The image length determining unit 312 reads out the relationship between the distance previously stored in a storing unit thereof (not shown) and a scale interval. Then, the image length determining unit 312 selects a length of the scale image corresponding to the distance to the measurement object A1 that is the information received from the distance detector 10. The length of the scale image is a length of the scale image when the length of the measurement object is the same as the diameter of the range P1.

Then, the image length determining unit 312 subtracts the diameter of the range P1 from the length of the measurement object A2 that is the information received from the distance detector 10. The scale length determining unit 312 determines, as the length of the scale image to be generated by the scale image generator 11, the length of the scale image obtained by multiplying the selected length of the scale image by the result of the subtraction.

The image length determining unit 312 outputs information concerning the determined length of the scale image to the image generator 314.

Based on the color information of the measurement object A2 which is received from the image recognizer 36, the color information determining unit 318 determines color information contrasted to the received color information as color information of an image to be projected by the image projector 12.

For example, the color information determining unit 318 determines a hue contrasted to the hue of the measurement object A2 as a hue of an image to be projected by the image projector 12. The color information determining unit 318 may determine information indicating the strength of an irradiation light based on the brightness of the measurement object A2.

The color information determining unit 318 outputs color information determined to the image generator 314.

The image generator 314 generates scale image information with the scale size corresponding to the information received from the scale size determining unit 111. Then, the image generator 314 deletes part of scale marks on the scale image information generated, and thus changes the scale image information generated to scale image information with the scale marks spaced at the scale interval corresponding to the information received from the scale interval determining unit 310. Then, the image generator 314 deletes both side portions of the scale image information changed, and thus changes the scale image information changed to scale image information with the length corresponding to the information received from the image length determining unit 312. Further, the image generator 314 changes color information of the scale image changed, and thus changes the scale image changed to scale image with color information corresponding to the color information received from the color information determining unit 318.

The image generator 314 outputs the scale image information generated in this manner to the image projector 312.

(Operation of Cell Phone Device 3)

Hereinafter, operation of the cell phone device 3 is explained.

Figure 11:
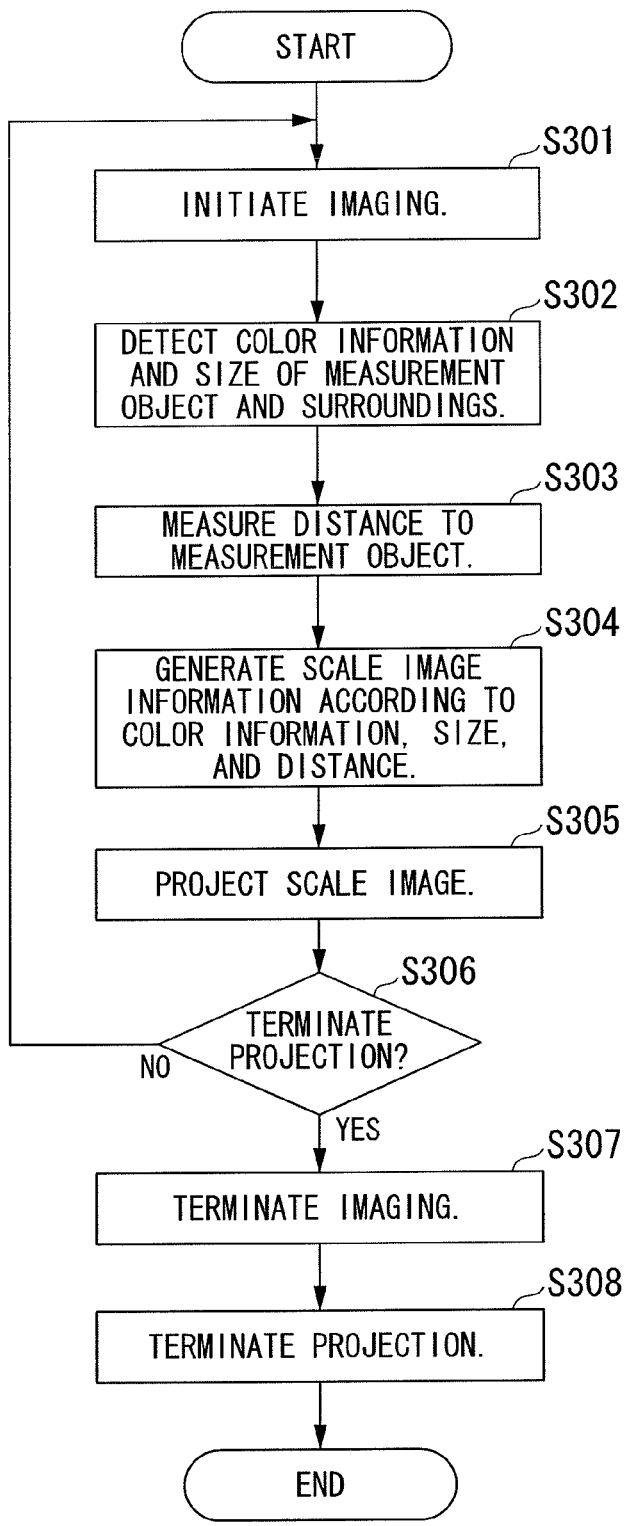
FIG. 11 is a flowchart illustrating operation of the cell phone device according to the third embodiment.

FIG. 11 is a flowchart illustrating operation of the cell phone device 3 according to the third embodiment.

(Step S301) The cell phone device 3 initiates imaging, and generates an image imagined. Then, the routine proceeds to step S302.

(Step S302) The cell phone device 3 detects, from the image generated in step S301, color information of the measurement object A2, the size of the measurement object A2, or color information of the surroundings of the measurement object A2. Then, the routine proceeds to step S303.

(Step S303) The cell phone device 3 detects the distance to the measurement object A2. Then, the routine proceeds to step S304.

(Step S304) The cell phone device 3 generates a scale image with a scale interval, the scale size, the length, and color information which are determined according to the size of the measurement object A2, and the color information of the measurement object A2 or the surroundings thereof, which are extracted in step S302, and the distance extracted in step S303. Then, the routine proceeds to step S305.

(Step S305) The cell phone device 3 projects the scale image generated in step S305. Then, the routine proceeds to step S306.

(Step S306) The cell phone device 3 determines whether or not an order to terminate the projection has been received through an operation of an operator of the cell phone device 3. When the cell phone device 3 determines that an order to terminate the projection has been received (YES), the routine proceeds to step S307. On the other hand, when the cell phone device 3 determines that an order to terminate the projection has not been received (NO), the routine proceeds to step S301.

(Step S307) The cell phone device 3 terminates imaging. Then, the routine proceeds to step S308.

(Step S308) The cell phone device 3 terminates the projection of the scale image.

As explained above, according to the third embodiment, the cell phone device 3 determines color information of a scale to be projected, based on color information of the measurement object in the image information generated by imaging. Accordingly, for example, color information contrasted to the color information of the measurement object A3 is determined as the color information of a sale, and thereby a clear scale image can be projected onto the measurement object A3. Thus, a measurer can reliably measure the measurement object A3.

Additionally, according to the third embodiment, the cell phone device 3 receives an input of the measurement range based on the color information of the measurement object in the image information generated by imaging. Accordingly, the measurer can quickly measure the measurement object A3 in the measurement range without an input of a measurement range.

Fourth Embodiment

Hereinafter, a fourth embodiment of the present invention is explained in detail with reference to the accompanying drawings. A cell phone device 4 of the fourth embodiment has a laser pointer function of irradiating a laser light, and a function of irradiating a scale image between two measurement points specified with use of the irradiated laser light.

The outer appearance of the cell phone device 4 is the same as that of the cell phone device 1 (shown in FIGS. 2A and 2B). The distance detector 10 corresponds to a pointer irradiator 401 that emits a laser light, and a measurement point distance detector 402 that detects the distance by receiving a reflected light.

(Outline of Function of the Cell Phone Device 4)

Figure 12:
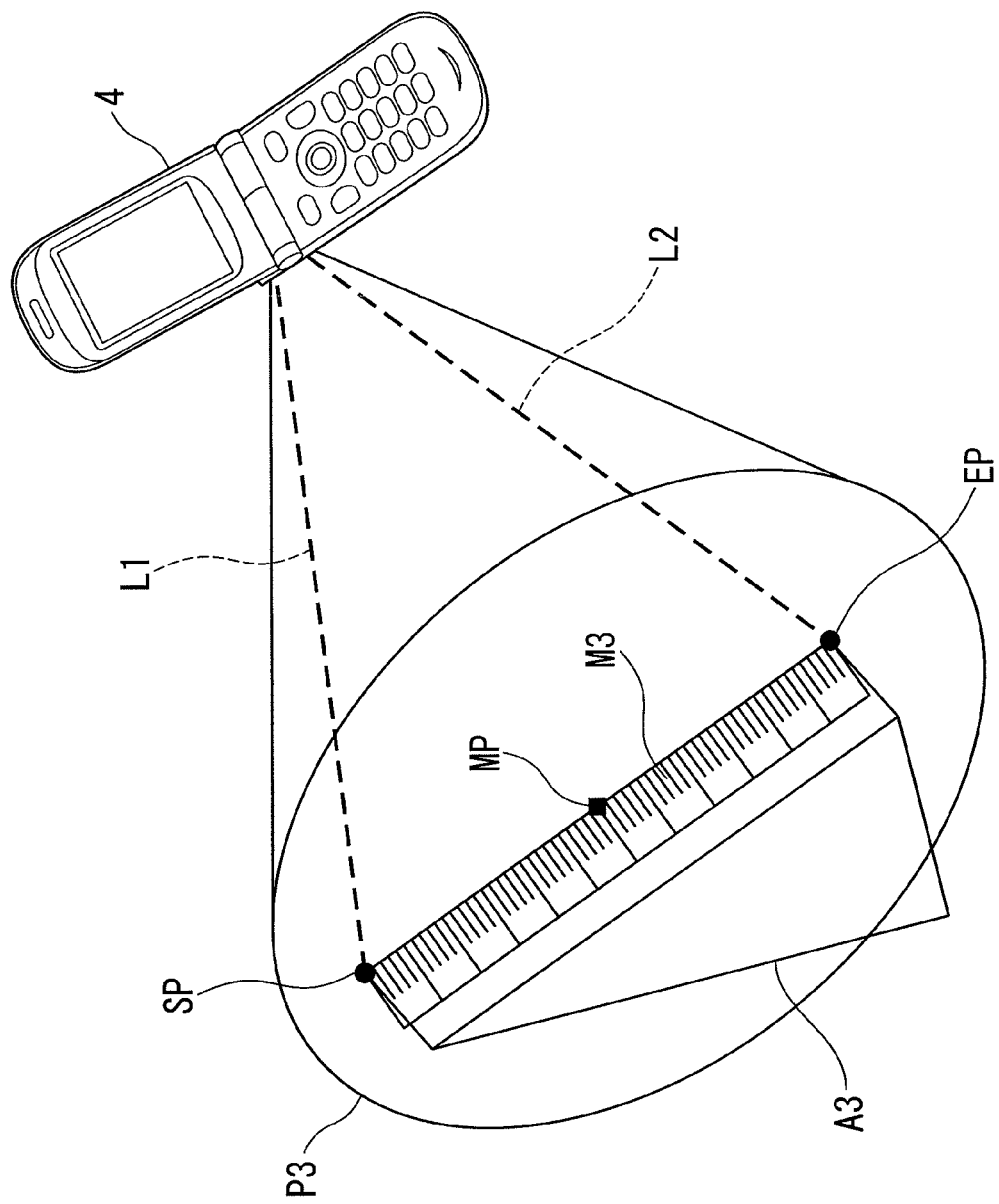
FIG. 12 is a schematic view illustrating an outline of a function of a cell phone device according to a fourth embodiment of the present invention.

FIG. 12 is a schematic view illustrating an outline of a function of the cell phone device 4 according to the fourth embodiment of the present invention.

This figure shows that the cell phone device 4 can project an image in a range P3 using a projector function of the cell phone device 4. Additionally, this figure shows that the cell phone device 4 is projecting a scale image M3 onto a measurement object A3 that is a projection target.

Further, this figure shows that the cell phone device 4 irradiates laser lights L1 and L2, and that measurement points SP and EP, which are laser spots, are shown on the measurement object A3. At this time, the figure shows that the scale image M3 is projected between the measurement points SP and EP. In this figure, a midpoint between the measurement points SP and EP is a midpoint MP denoted by a square mark.

(Configuration of Cell Phone Device 4)

Figure 13:
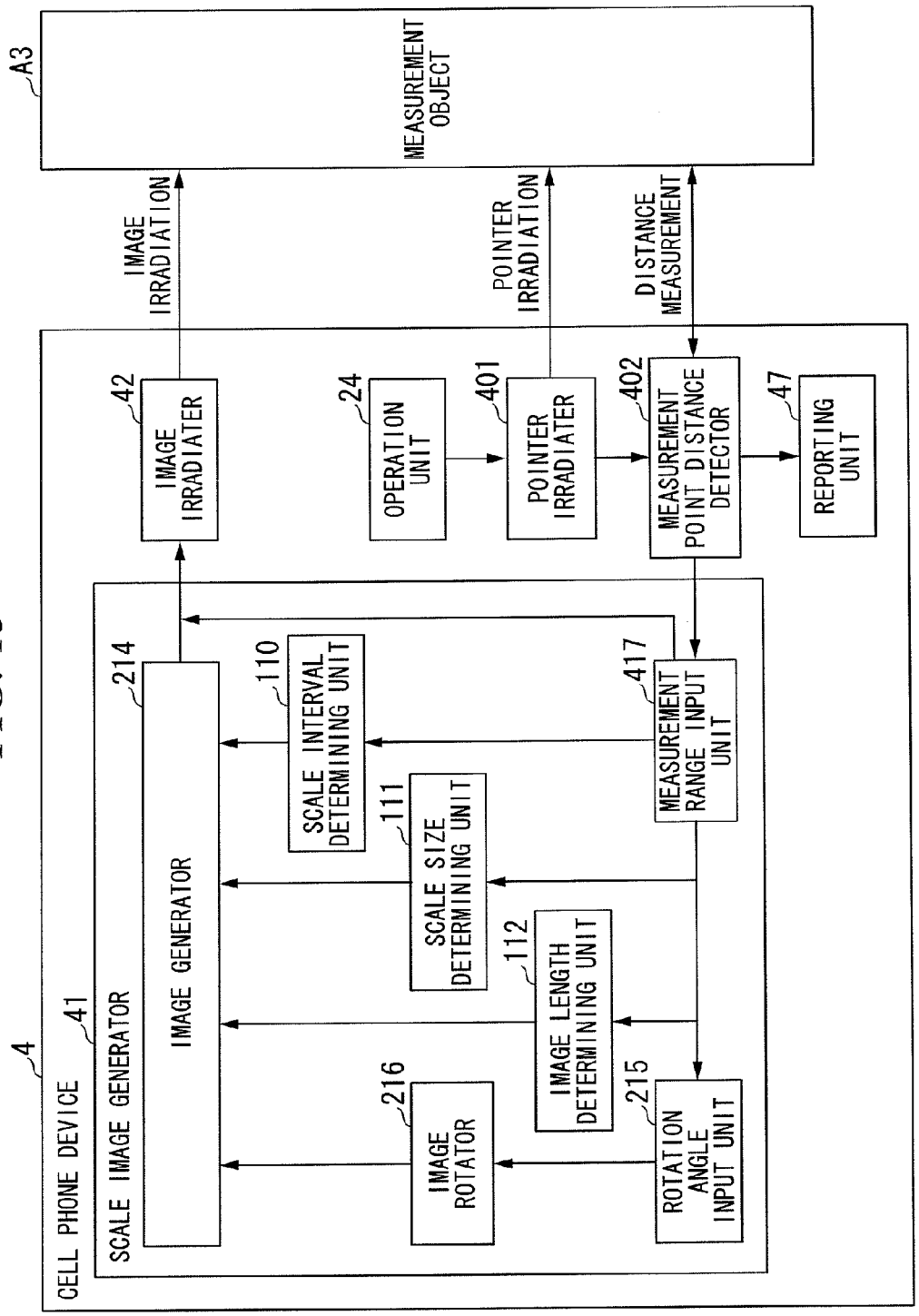
FIG. 13 is a schematic block diagram illustrating a configuration of the cell phone device 4 according to the fourth embodiment.

FIG. 13 is a schematic block diagram illustrating a configuration of the cell phone device 4 according to the fourth embodiment.

When the cell phone device 4 of the fourth embodiment (shown in FIG. 13) is compared to the cell phone device 2 of the second embodiment (shown in FIG. 6), a pointer irradiator 401, a measurement point distance detector 402, a measurement range input unit 417, an image projector 42, and a reporting unit 47 differ. However, other constituent elements (the operation unit 24, the scale interval determining unit 110, the scale size determining unit 111, the image length determining unit, the image generator 214, the rotation angle input unit 215, and the image rotator 216) have the same functions as those of the second embodiment. Therefore, explanations of the same functions as those of the second embodiment are omitted here.

FIG. 13 shows only a schematic configuration related to explanations of the fourth embodiment.

The pointer irradiator 401 irradiates laser lights L1 and L2 shown in FIG. 12. The pointer irradiator 401 outputs an irradiation time and an irradiation angle of the laser lights to the measurement distance detector 402. The pointer irradiator 401 controls initiation and termination of irradiating the laser lights L1 and L2, an irradiation direction, and the like, according to information received from the operation unit 24.

The measurement point distance detector 402 receives reflected lights of the laser lights irradiated by the pointer irradiator 401, and detects the distance to a measurement object A3 based on a time difference between the irradiation time of the laser lights received from the pointer irradiator 401 and the reception time of the reflected lights from the measurement object A3, and on the speed of the lights. A method for the measurement point distance detector 402 to detect the distance is not limited thereto, and another method may be used.

The measurement point distance detector 402 outputs, to the measurement range input unit 417, information concerning the irradiation angles of the laser lights received from the pointer irradiator 401, and the distance to the detected measurement points SP and EP. The measurement point distance detector 402 outputs, to the reporting unit 47, information concerning the distance to the detected measurement points SP and EP.

The measurement range input unit 417 calculates the distance to a midpoint MP between the measurement points SP and EP based on the information received from the measurement point distance detector 402. Then, the measurement range input unit 417 outputs the calculated distance to the scale interval determining unit 110, the scale size determining unit 111, and the image irradiator 42.

Additionally, the measurement range input unit 417 calculates the direction to the midpoint MP. The measurement range input unit 417 calculates a rotation angle of a line connecting the measurement points SP and EP on a plane perpendicular to the direction to the midpoint MP. The measurement range input unit 417 outputs the rotation angle calculated to the rotation angle input unit 215.

Additionally, the measurement range input unit 417 outputs, to the image irradiator 42, information concerning the direction to the midpoint MP.

The image irradiator 42 projects the scale image received from the scale image generator 41 onto a measurement object in the direction to the midpoint which is included in the information received from the measurement range input unit 417. The scale image received from the scale image generator 41 is the scale image that is rotated on the plane perpendicular to the direction to the midpoint MP by the rotation angle of the line connecting the measurement points SP and EP. Thereby, the image irradiator 42 can project a scale image M3 onto the line connecting the measurement points SP and EP.

Additionally, the image projector 42 controls a focus of the lens based on the distance to the midpoint MP which is received from the measurement range input unit 417.

When the distance to the measurement point SP and the distance to the measurement point EP, which are included in the information received from the measurement point distance detector 402, are identical, the reporting unit 47 reports that the two distances are identical. When the distance to the measurement point SP and the distance to the measurement point EP are identical, the direction in which the image irradiator 42 irradiates the scale image M3 becomes equal to the direction to the midpoint MP, and the scale image M3 is projected in a direction perpendicular to the line connecting the measurement points SP and EP.

The scale image generator 41 may calculate elements of the irradiation direction of the measurement points SP and WP (the direction to the midpoint MP) and generate the scale image M3 so that the scale image M3 in actual size is projected onto the line connecting the measurement points SP and EP. The scale image generator 41 may generate the scale image M3 so that the scale image M3 is projected only onto a region between the measurement points SP and EP where the measurement point SP is assumed to be the zero point of the scale.

Additionally, the cell phone device 4 may detect the distance between the measurement points SP and EP, and project a real number indicating the detected distance between the detected measurement points SP and EP.

In this case, for example, the measurement range input unit (inter-measurement-point distance detector) 417 detects the distance between the measurement points SP and EP based on the information received from the measurement point distance detector 402. Then, the measurement range input unit 417 outputs, to the image irradiator 42, information concerning the detected distance between the measurement points SP and EP. The image irradiator 42 projects information indicating the distance between the measurement points SP and EP (for example, 6 cm), which is received from the measurement range input unit 417.

The information indicating the distance between the measurement points SP and EP may be a number obtained by rounding off to the closest whole number, rounding down, or rounding up the real number indicating the distance. Alternatively, the information indicating the distance between the measurement points SP and EP may be a Chinese character. A unit of the information indicating the distance between the measurement points SP and EP may be, for example, millimeter, sun, shaku, inch, feet, or the like. The measurement range input unit 417 may determine the unit of the information indicating the distance between the measurement points SP and EP according to the distance to the midpoint MP calculated.

(Operation of Cell Phone Device 4)

Hereinafter, operation of the cell phone device 4 is explained.

Figure 14:
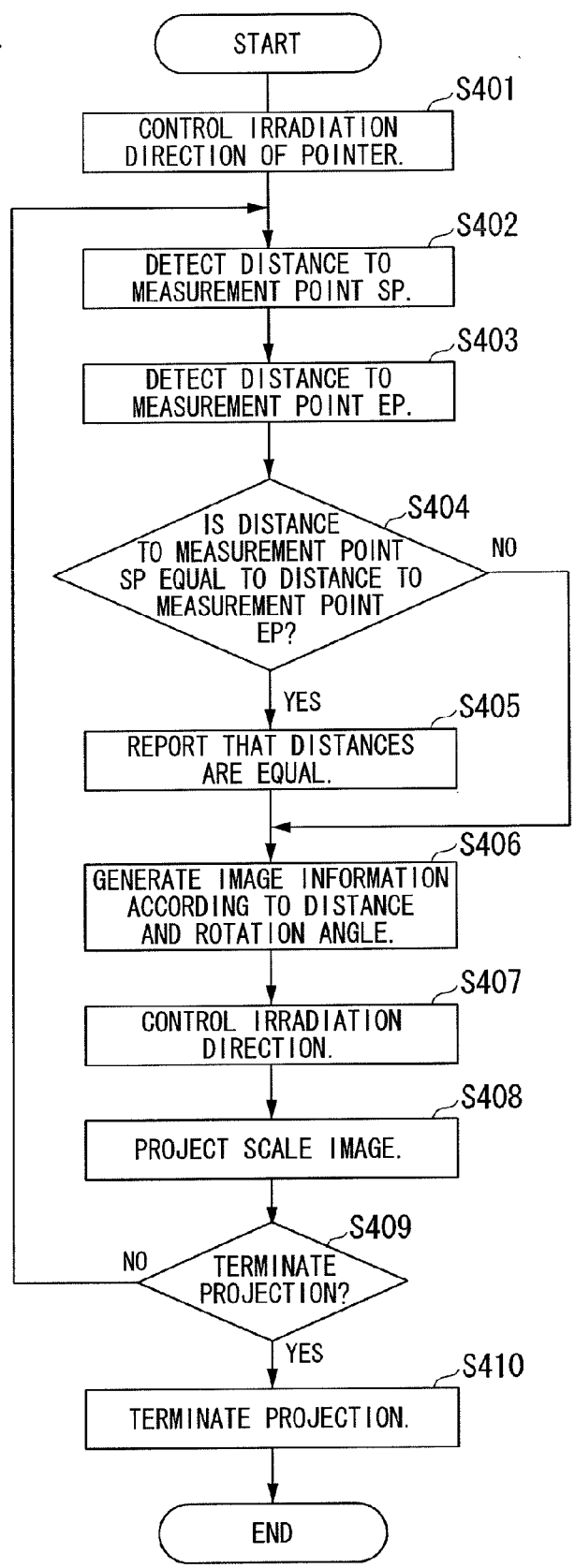
FIG. 14 is a flowchart illustrating operation of the cell phone device 4 according to the fourth embodiment.

FIG. 14 is a flowchart illustrating operation of the cell phone device 4 according to the fourth embodiment.

(Step S401) The cell phone device 4 controls the irradiation directions of the laser lights L1 and L2 according to information received from the operation unit 24. Then, the routine proceeds to step S402.

(Step S402) The cell phone device 4 detects the distance to the measurement point SP. Then, the routine proceeds to step S403.

(Step S403) The cell phone device 4 detects the distance to the measurement point EP. Then, the routine proceeds to step S404.

(Step S404) The cell phone device 4 determines whether or not the distance to the measurement point SP is equal to the distance to the measurement point EP.

When it is determined as a result of the determination that the distance to the measurement point SP is equal to the distance to the measurement point EP (YES), the routine proceeds to step S405. On the other hand, when it is determined as a result of the determination that the distance to the measurement point SP is not equal to the distance to the measurement point EP (NO), the routine proceeds to step S406.

(Step S405) The cell phone device 4 reports that the distance to the measurement point SP is equal to the distance to the measurement point EP. Then, the routine proceeds to step S406.

(Step S406) The cell phone device 4 generates scale image information according to the distance to the midpoint MP and the rotation angle of the line connecting the measurement points SP and EP. Then, the routine proceeds to step S407.

(Step S407) The cell phone device 4 performs a control to change the irradiation direction of the scale image to the direction to the midpoint MP. Then, the routine proceeds to step S408.

(Step S408) The cell phone device 4 projects the scale image of the scale image information generated in step S406.

(Step S409) The cell phone device 4 determines whether or not an order to terminate the projection has been received through an operation of an operator of the cell phone device 4. When it is determined that an order to terminate the projection has been received (YES), the routine proceeds to step S410. On the other hand, when it is determined that an order to terminate the projection has not been received (NO), the routine proceeds to step S402.

(Step S410) The cell phone device 4 terminates the projection of the scale image M3.

As explained above, according to the fourth embodiment, the cell phone device 4 projects the scale image M3 between the two measurement points SP and EP received. Accordingly, a measurer can reliably measure the length between the two measurement points to be measured.

Additionally, according to the fourth embodiment, when the detected distances to the two measurement points received are identical to each other, the cell phone device 4 reports that the distances to the two measurement points are identical. Accordingly, the cell phone device 4 can report that the scale image is to be projected in a direction perpendicular to the line connecting the two measurement points. Thus, the measurer can recognize that the scale image, which is not distorted due to the depth in the irradiation direction, is being projected.

Although the case, in which the cell phone device 3 detects the distance between the cell phone device 3 and the measurement object A2 by the distance detector 10 transmitting and receiving an electric wave, has been explained in the third embodiment, the present invention is not limited thereto. The distance between the cell phone device 3 and the measurement object A2 to be imaged may be detected by the autofocus function of the imager 35.

The cases, in which the image projectors 12 of the cell phone devices 1 to 4 are liquid crystal projectors, have been explained in the respective embodiments, the present invention is not limited thereto. A laser projector using a laser light may project a scale image. In this case, since a laser light goes straight, the cell phone devices 1 to 4 can project a clear scale image without performing a control to adjust a focus of the scale image. Particularly, in the fourth embodiment, a precise and clear scale image can be projected onto the measurement object A2 even if the measurement object A2 is a three-dimensional object such that the distance to the measurement point SP differs from the distance to the measurement point EP. When the measurement object A2 such that the distance to the measurement point SP differs from the distance to the measurement point EP is to be measured, it is preferable to project a scale image such that a pitch of the scale becomes smaller as the distance to a measurement point increases.

It has been explained in each of the embodiments that the scale image is a scale image for measuring the straight length. However, the present invention is not limited thereto. For example, the scale image may be a protractor image for measuring an angle, or an image in which a scale is added to a curve. In FIGS. 1, 9, and 12, the scale images M1 to M3 may be images in which points are arranged at the actual interval.

Although it has been explained in the respective embodiments that the cell phone devices 1 to 4 generate the scale image by determining the size and scale interval of the image, the present invention is not limited thereto. For example, the cell phone devices 1 to 4 may previously generate a scale image, change a field angle of the projector optical unit, and thereby project the scale image with the determined size and scale interval of the image.

Although it has been explained in the respective embodiments that the cell phone devices 1 to 4 determine the scale interval according to the detected distance to the measurement object or the size of the measurement range, and then irradiates a scale image, the present invention is not limited thereto. For example, the cell phone devices 1 to 4 may change the scale interval according to information input through the operation unit 24 by an operation of a measurer, and thereby irradiate a scale image.

In the respective embodiments, the cell phone devices 1 to 4 increase and decrease in size a scale image based on information received from the operation unit 24.

In the respective embodiments, the cell phone devices 1 to 4 may generate and project two or more scale images, and then change the scale images by rotation or the like. In this case, the cell phone device 2 may display an angle at which the two scale images cross each other.

In the respective embodiments, the cell phone devices 1 to 4 may clearly show a scale unit on a scale image. For example, the cell phone devices 1 to 4 may clearly show a number or a unit on a scale image. Alternatively, the cell phone devices 1 to 4 may display a scale image, such as the images M1 to M3.

In the respective embodiments, the cell phone devices 1 to 4 may include an imager that images a measurement object and a scale image projected onto the measurement object, and store information obtained by imaging the measurement object and the scale image.

A computer may implement part of the cell phone devices 1 to 4 of the above embodiments, such as the scale interval determining units 110 and 310, the scale size determining unit 111, the image length determining units 112 and 312, the brightness determining unit 213, the image generators 114, 214, and 314, the rotation angle input unit 215, the image rotator 216, the measurement range input units 317 and 417, and the color information determining unit 318. In this case, the part of the cell phone devices 1 to 4 may be implemented by recording a program for implementing these control functions on a computer readable recording medium, and by causing a computer system to read and execute the program recorded on the recording medium. The "computer system" is a built-in computer system in the cell phone device, which includes an OS and hardware such as peripheral devices. Additionally, the "computer readable recording medium" includes a portable medium such as a flexible disc, a magneto-optical disc, a ROM, or a CD-ROM, and a storage device such as a built-in hard disk in the computer system. Further, the "computer readable recording medium" may include a medium that dynamically stores a program for a short period of time, such as a communication wire when the program is transmitted via a network such as the Internet or via a communication line such as a telephone line. Additionally, the "computer readable recording medium" may include a medium that stores a program for a fixed period of time, such as a volatile memory in a computer system serving as a server or client when the program is transmitted in the above manner. Moreover, the program may be one for implementing part of the aforementioned functions. Additionally, the program may be one that combines with a program already recorded on the computer system to implement the aforementioned functions.

Although an embodiment of the present invention has been explained in detail with reference to the accompanying drawings, the specific configuration is not limited thereto. Various modifications and the like can be made without departing from the scope of the present invention.

INDUSTRIAL APPLICABILITY

The present invention is suitable to a projection device and similar technology to the projection device, and can quickly and reliably measure the size of an object to be measured.

DESCRIPTION OF REFERENCE NUMERALS 1, 2, 3, and 4: cell phone device
10: distance detector
401: pointer irradiator
402: measurement point distance detector
11, 21, 31, and 41: scale image generator
12 and 42: image projector
23: brightness detector
24: operation unit
35: imager
36: image recognizer
47: reporting unit
110 and 310: scale interval determining unit
111: scale size determining unit
112 and 312: image length determining unit
113 and 213: brightness determining unit
114, 214, and 314: image generator
215: rotation angle input unit
216: image rotator:
317 and 417: measurement range input unit
318: color information determining unit
121: optical operation unit
122: image signal processor
123: lamp unit
124: LCD panel unit
125: projector optical unit

The invention claimed is:

1. A projection device that projects an image, comprising:
a distance detector that detects a distance between the projection device and a measurement object onto which the image is to be projected;
a scale interval determining unit that determines a scale interval based on the distance detected by the distance detector; and
an image projector that projects a scale image in actual size onto the measurement object, a part of scale marks on the scale image being deleted so that a remaining part of the scale marks are spaced at the scale interval determined based on the distance detected by the distance detector.

2. A projection device that projects an image, comprising:
a measurement range input unit that receives specification of two measurement points;
a distance detector that detects a distance between the projection device and a measurement object onto which the image is to be projected;
an image projector that projects a scale image in actual size between the two measurement points received by the measurement range input unit, a part of scale marks on the scale image being deleted so that a remaining part of the scale marks are spaced at the scale interval determined based on the distance detected by the distance detector.

3. The projection device according to claim 2, further comprising:
an inter-measurement-point distance detector that detects a distance between the two measurement points received by the measurement range input unit,
wherein the image projector projects an image of information indicating the distance between the two measurement points detected by the inter-measurement-point distance detector.

4. The projection device according to claim 2, further comprising:
a measurement point distance detector that detects a distance between the projection device and one of the measurement points received by the measurement range input unit, and a distance between the projection device and the other one of the measurement points; and
a reporting unit that reports that the distance between the projection device and the one of the measurement points is identical to the distance between the projection device and the other one of the measurement points, when the distances detected by the measurement point distance detector are identical.

5. A projection device control method for a projection device that projects an image, the projection device control method comprising:
a first step of a distance detector detecting a distance between the projection device and a measurement object onto which the image is to be projected;
a second step of a scale interval determining unit determining a scale interval based on the distance detected by the distance detector; and
a third step of an image projector projecting a scale image in actual size onto the measurement object, a part of scale marks on the scale image being deleted so that a remaining part of the scale marks are spaced at the scale interval determined based on the distance detected by the distance detector.

6. A non-transitory, computer readable storage medium having a projection device control program stored therein that, when executed, causes a computer of a projection device that projects an image to:
detect a distance between the projection device and a measurement object onto which the image is to be projected;
determine a scale interval based on the distance detected by the distance detecting step; and
project a scale image in actual size onto the measurement object, a part of scale marks on the scale image being deleted so that a remaining part of the scale marks are spaced at the scale interval determined based on the distance detected by the distance detecting step.

* * * * *